United States Patent [19]

Hirayama et al.

[11] 4,233,612
[45] Nov. 11, 1980

[54] IMAGE INFORMATION ELECTROSTATIC RECORDING DEVICE

[75] Inventors: Kazuhiro Hirayama, Yokohama; Yasushi Sato, Kawasaki; Taisuke Tokiwa, Yokohama; Kazuo Kawakubo, Hino; Fujio Iwatate, Tokyo; Hisashi Nakatsui, Kawasaki, all of Japan

[73] Assignee: Canon Kabushiki Kaisha, Tokyo, Japan

[21] Appl. No.: 901,788

[22] Filed: May 1, 1978

Related U.S. Application Data

[63] Continuation of Ser. No. 594,126, Jul. 8, 1975, abandoned.

[30] Foreign Application Priority Data

| | | |
|---|---|---|
| Jul. 10, 1974 [JP] | Japan | 49-79475 |
| Aug. 22, 1974 [JP] | Japan | 49-96500 |
| Sep. 14, 1974 [JP] | Japan | 49-106342 |
| Oct. 14, 1974 [JP] | Japan | 49-117892 |
| Dec. 17, 1974 [JP] | Japan | 49-144727 |

[51] Int. Cl.$^3$ .......................................... G03G 15/00
[52] U.S. Cl. .................................................. 346/160
[58] Field of Search .............. 346/160, 153, 158, 159, 346/108; 358/300; 355/3 DD

[56] References Cited

U.S. PATENT DOCUMENTS

| | | | |
|---|---|---|---|
| 3,389,403 | 6/1968 | Cottingham et al. | 346/108 |
| 3,448,458 | 6/1969 | Carlson et al. | 346/108 X |
| 3,457,070 | 7/1969 | Watanabe | 346/160 |
| 3,609,031 | 9/1971 | Kinoshita | 346/160 |
| 3,687,025 | 8/1972 | Rosin | 346/160 |
| 3,747,119 | 7/1973 | Matkan | 346/160 |
| 3,776,627 | 12/1973 | Ohnishi | 346/160 |
| 3,800,303 | 3/1974 | Picquendar et al. | 355/3 X |
| 3,818,492 | 6/1974 | Matkan | 346/160 |

FOREIGN PATENT DOCUMENTS 1255962 12/1967 Fed. Rep. of Germany .
1920807 11/1969 Fed. Rep. of Germany .

OTHER PUBLICATIONS

IBM/TDB vol. 10, No. 9, Feb. 1968, "High Speed Buffer, Display, and Printer," by Supernowicz.

*Primary Examiner*—John H. Wolff
*Attorney, Agent, or Firm*—Fitzpatrick, Cella, Harper & Scinto

[57] ABSTRACT

An image information device of a construction wherein there are provided a laser oscillator; a modulator capable of modulating a laser beam oscillated from the laser oscillator by an external signal; a photosensitive body consisting essentially of an insulating layer, a photoconductive layer, and an electrically conductive substrate; a principal scanning means such as a polygonal revolving mirror, galvano-mirror, etc. to cause the modulated laser beam to scan the photosensitive body in the principal scanning direction; an optical system to cause the laser beam to focus on the photosensitive body; a position detection means to establish a commencing position of the scanning laser beam on the photosensitive body; means to input an image signal into the modulator in synchronism with the principal scanning means by an output from the position detection means; means to electrically charge the photosensitive body; corona discharge means to impress on the photosensitive body an A.C. corona discharge or a D.C. corona discharge having an opposite polarity to the above-mentioned electric charge simultaneously with, or immediately before, or immediately after, the scanning of the photosensitive body with the laser beam; means to effect overall exposure of the photosensitive body; means to develop an electrostatic latent image formed by the abovementioned means; means to transfer the latent image onto an image transfer material; and means to clean the photosensitive body.

48 Claims, 36 Drawing Figures

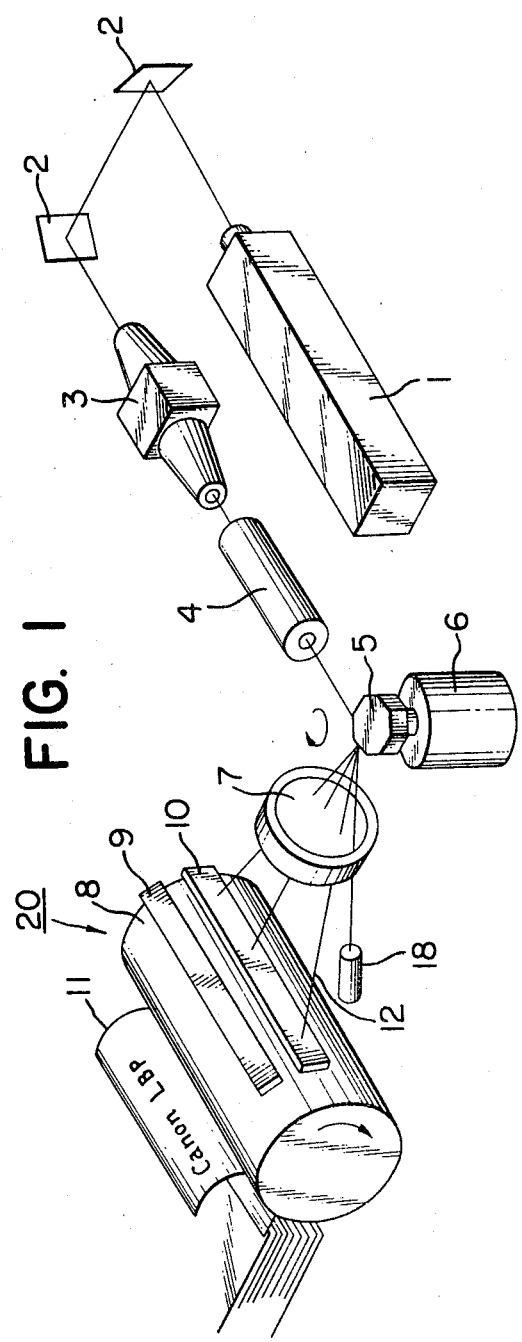
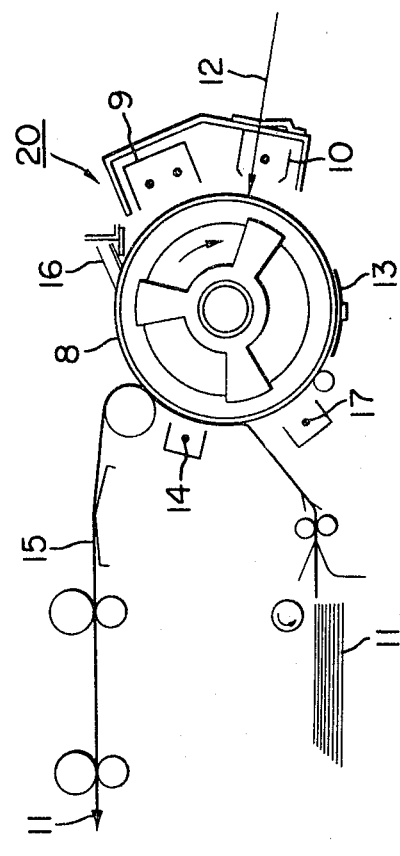
FIG. 1
FIG. 2

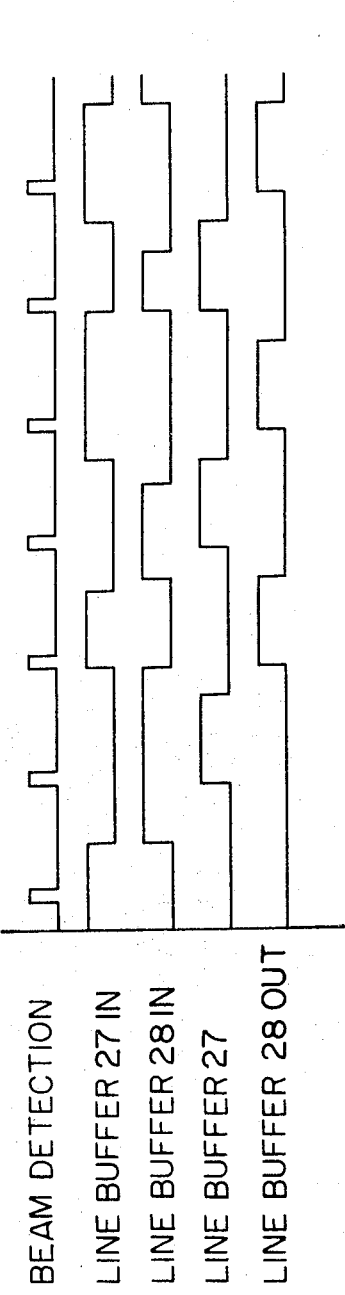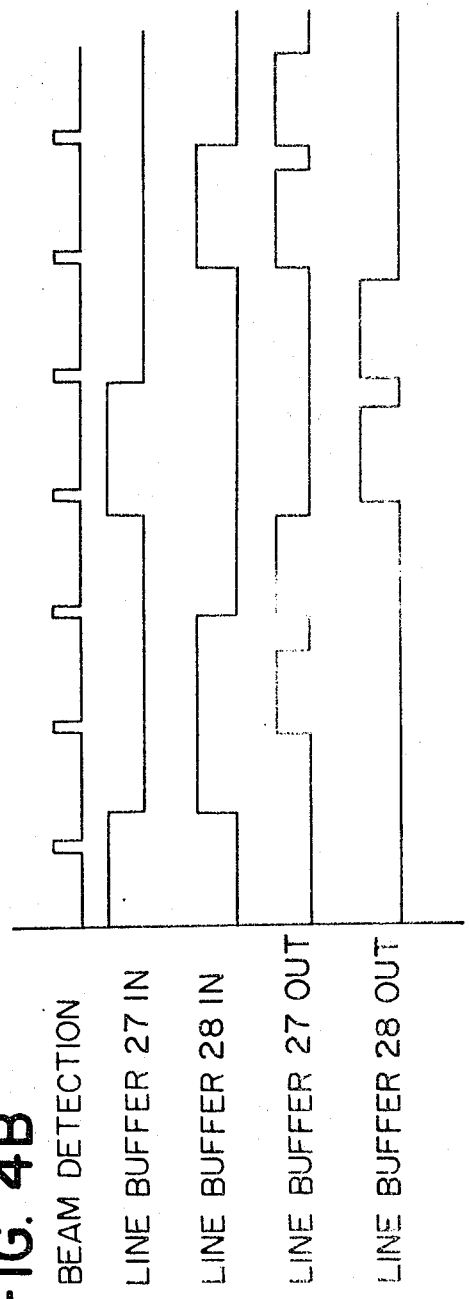

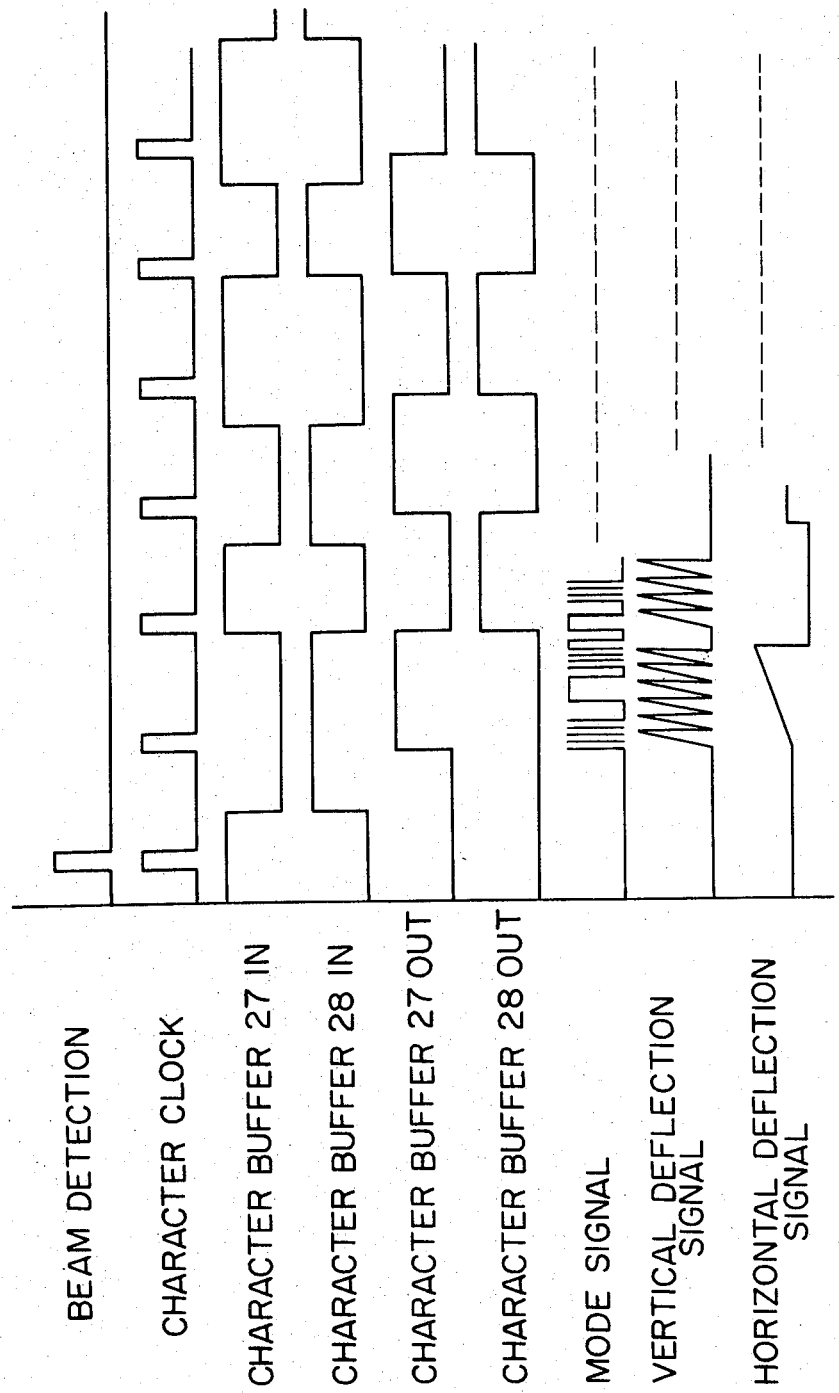

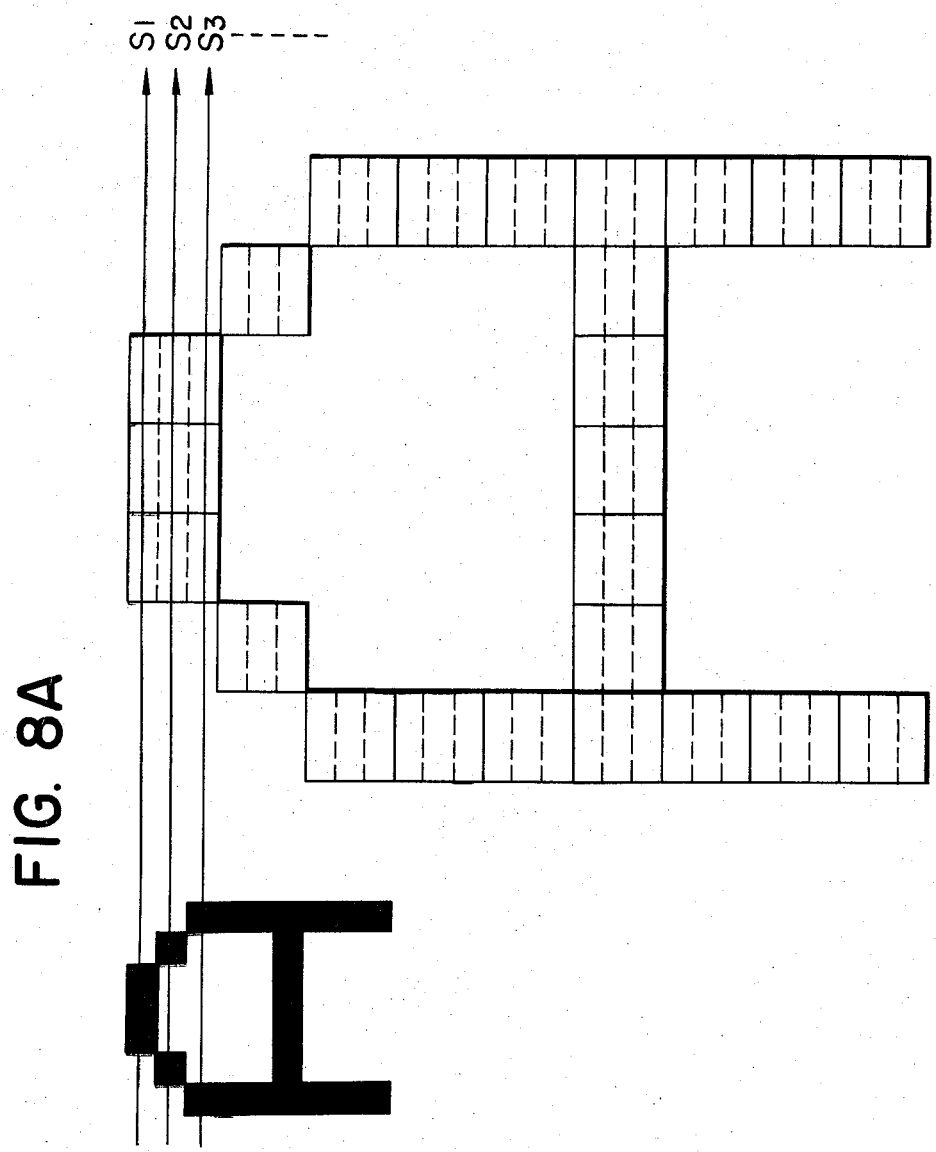

FIG. 17B
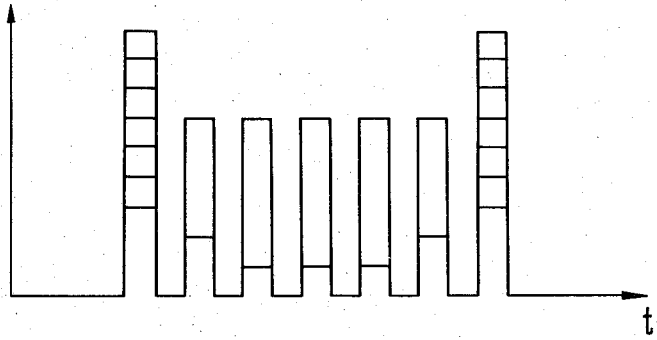
FIG. 17C
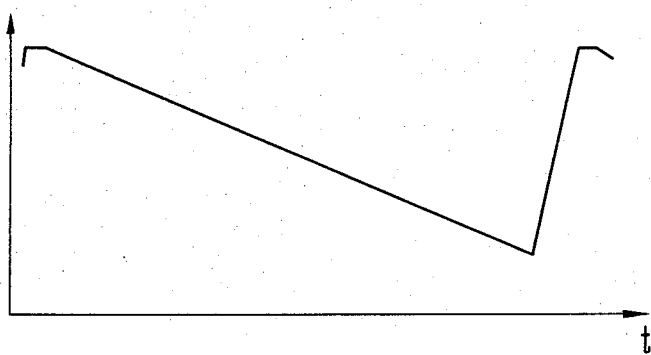
FIG. 18A
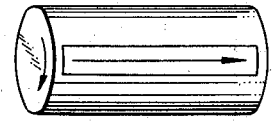
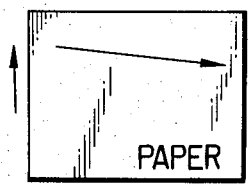
FIG. 18B
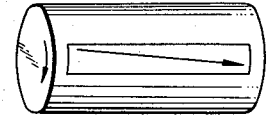
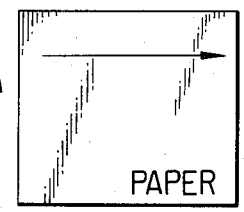
FIG. 18C
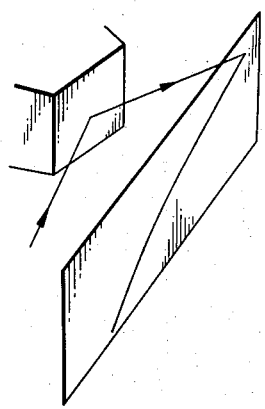

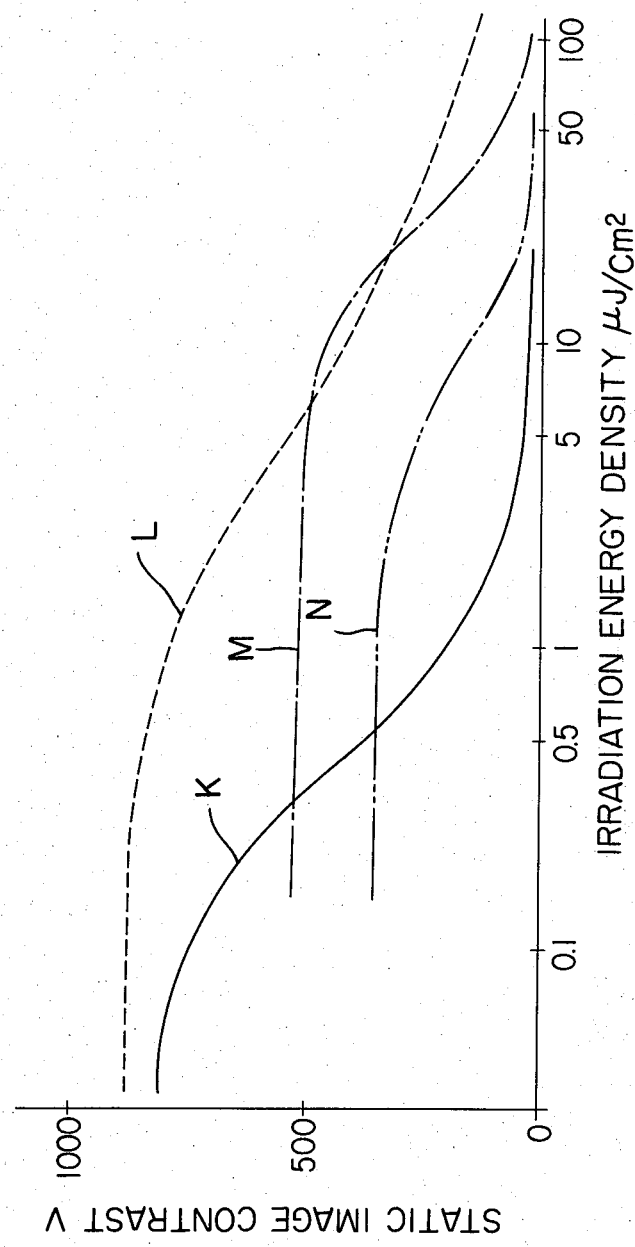

IMAGE INFORMATION ELECTROSTATIC RECORDING DEVICE

This is a continuation of application Ser. No. 594,126, filed July 8, 1975, now abandoned.

BACKGROUND OF THE INVENTION

1. Field of the Invention

This invention relates to a recording device wherein pattern and character information are printed out at a high speed from electronic computers, etc. More particularly, the present invention is concerned with a device which forms an image information pattern on a photosensitive body by deflecting and modulating a laser beam with pattern and character information emanating from electronic computers, and so forth and then produces a high quality hard copy of such image information at a high speed by use of an image transfer type electrophotographic process.

2. Description of the Prior Art

With recent trends toward high performance electronic computers, it has been desired that a high speed output device for high quality pattern and character information, etc. be developed. For the high speed output device for character information alone, there has heretofore been known a drum-type mechanical impact line printer, a multi-stylus electrostatic printer, a CRT printer which is a combination of CRT (mainly OFT) and the electrophotographic process.

However, the mechanical impact line printer is limited in its print-out speed, and has such disadvantages as tremendous noise from its mechanical parts, poor reliability in operation, and so forth. The multi-stylus electrostatic printer is limited in its resolution, and has such disadvantages that expensive electrostatic recording sheets must be used as the recording material, and others. Further, the CRT printer is disadvantageous in its difficulty in maintaining, over a long period of time, the desired high quality printing state due to a low degree of stability in the CRT driving circuit, and so on.

In view of the foregoing, there have developed various difficulties with character information output devices of various known types when outputting at high speed characters of complicated configurations such as, in particular, Chinese characters.

Further, there have been known heretofore various output devices for pattern informations alone such as a mechanical X-Y plotter, a drafter, a multi-stylus electrostatic plotter, a CRT plotter to optically record an information pattern displayed on the CRT for display purposes, and others. Of these known devices, the mechanical X-Y plotter and the drafter are disadvantageous because of their very low recording speed. The multi-stylus electrostatic plotter, on the other hand, has the disadvantage that the recording paper should be a specially processed paper. Furthermore, the CRT plotter is accompanied by such disadvantages as low resolution in the CRT per se, inferior stability, insufficient light intensity, etc..

SUMMARY OF THE INVENTION

In view of various disadvantages inherent in the heretofore known output devices for pattern and character information, as outlined in the foregoing, it is the primary object of the present invention to provide a device for recording pattern and character information, etc. from electronic computers, etc. on an ordinary paper material to produce a hard copy at a high print-out speed and with a high image quality, while eliminating various defects in the known output devices as described above.

According to the present invention, in one aspect thereof, there is provided an image information device which comprises: a laser oscillator; a modulator (or an internal modulation type laser oscillator) capable of modulating a laser beam oscillated from the laser oscillator by an external signal; a photosensitive body consisting essentially of an insulating layer, a photo-conductive layer, and an electrically conductive substrate; a principal scanning means such as a polyhedral revolving mirror, galvano-mirror, etc. to cause the modulated laser beam to scan the photosensitive body in the principal scanning direction; an optical system to cause the laser beam to focus on the photosensitive body; a position detection means to establish a commencing position for the scanning laser beam on the photosensitive body; means to input an image signal into the modulator in synchronism with the principal scanning means by an output from the position detection means; means to electrically charge the photosensitive body; corona discharge means to impress on the photosensitive body an alternating current corona discharge or a direct current corona discharge having an opposite polarity to the abovementioned electric charge simultaneously with, or immediately prior to, or immediately after, the scanning of the photosensitive body with the laser beam; means to effect overall exposure of the photosensitive body; means to develop an electrostatic latent image formed by the abovementioned every means; means to transfer the latent image onto an image transfer material; and means to clean the photosensitive body.

According to another aspect of the present invention, there is provided an image information recording device capable of operating at a high speed and a high sensitivity by use of a photosensitive body provided with photosensitive material having a spectral sensitivity characteristic matching the wavelength from the laser oscillator.

According to a further aspect of the present invention, there is provided an image information recording device wherein, in addition to the principal scanning means which deflects the laser beam in the principal scanning direction, means to subject the laser beam to a micro-deflection in both parallel and vertical directions with respect to the principal scanning direction is provided so as to be able to perform a high speed operation and to effect alternation of spacing between adjacent letters, in line and row, as well as deformation of the letters, and so on.

The foregoing objects and other objects of the present invention will become more apparent from the following detailed description thereof when read in conjunction with the accompanying drawing.

BRIEF DESCRIPTION OF THE DRAWING

In the drawing:

FIG. 1 is a perspective diagrammatic view showing a construction of one embodiment of the image information recording device according to the present invention;

FIG. 2 is a cross-sectional view of one example of the printing section 20 in FIG. 1;

FIGS. 4A, 4B and 4C are respectively signal waveforms at various sections of the block diagram in FIG. 3;

FIGS. 8A and 8B respectively show examples of the constructions in pattern and character information capable of being recorded by the device according to the present invention;

FIGS. 14A through 17C inclusive respectively show various examples of deflection means applicable to the recording device according to the present invention, wherein FIGS. 14A, 15A, 16A and 17A are perspective views of the deflecting means; FIGS. 14B, 15B, 16B and 17B are respectively waveform diagrams of a vertical deflection input signal; and FIGS. 14C, 15C, 16C and 17C are respectively waveform diagrams of a horizontal deflection input signal;

FIGS. 18A, 18B and 18C are respectively diagrams showing how inclination in the scanning line on the photosensitive drum can be corrected;

FIG. 21 is also a graphical representation showing sensitivity characteristics of the same photosensitive materials as in FIG. 20 with respect to He-Ne gas laser beam.

DETAILED DESCRIPTION OF THE PREFERRED EMBODIMENTS

Basic Embodiment

Figure 3:
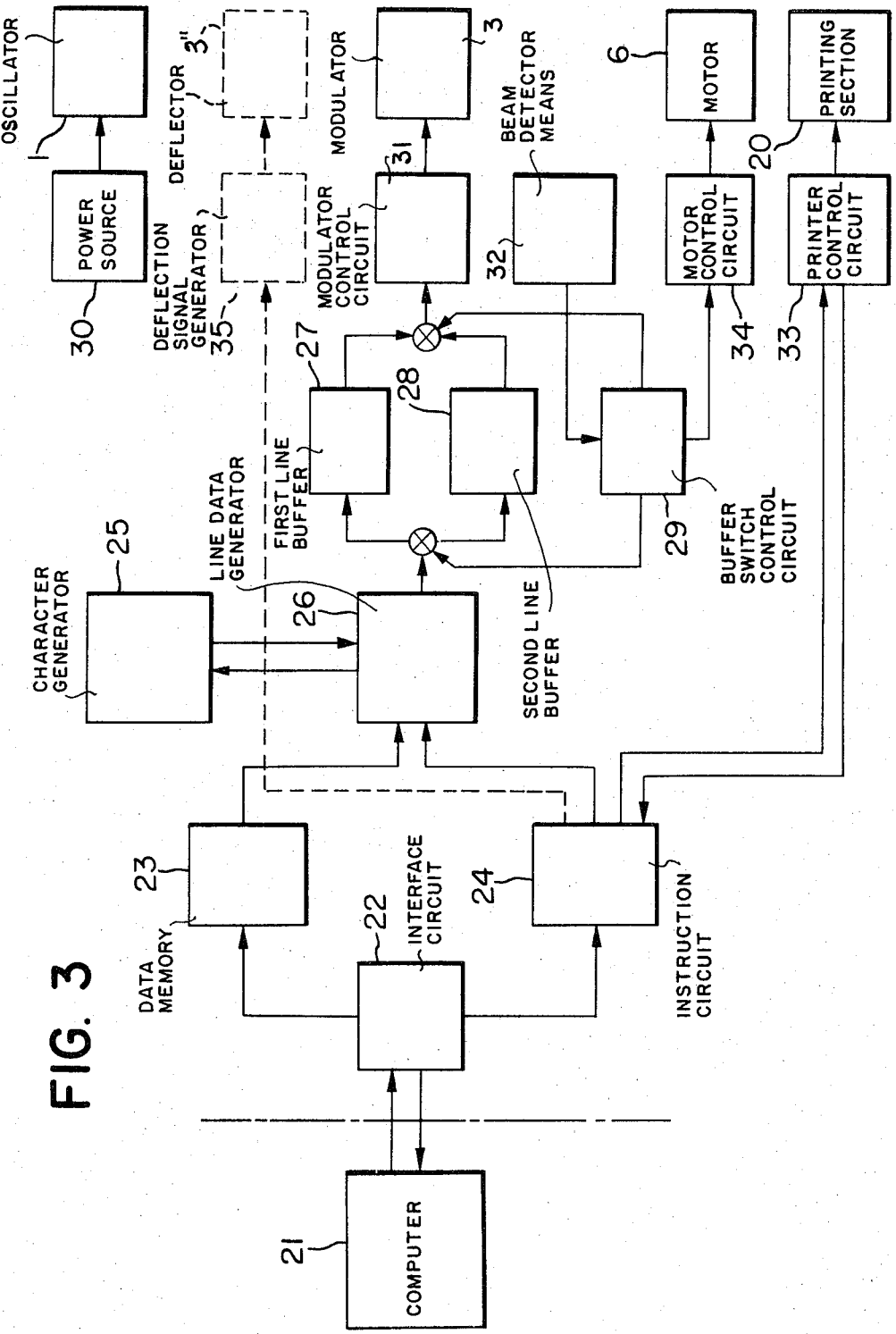
FIG. 3 is a block diagram showing schematically electronic processing and control circuitry in accordance with the present invention for preparation of a hard print-out copy from pattern and character information.

Referring first to FIG. 1, the basic construction of the image information recording device according to the present invention will be explained.

1. Image Information Formation

A laser beam oscillated from a laser oscillator 1 is led into an input opening of a modulator 3 by way of reflection mirrors 2. These reflection mirrors 2 are installed to bend the light path merely for the purpose of reducing the space within the device. They can therefore be dispensed with, if such reduction in space is not required. For the modulator 3, there can be used an acoustic optical modulating element utilizing the well known acoustic-optical effect, of an electro-optical element utilizing the electro-optical effect. The laser beam in the modulator 3 is subjected to modulation ranging from a strong to a weak degree in accordance with an input signal into the modulator 3.

When the laser oscillator to be used is a semiconductor laser, or a gas laser, etc., in which current modulation is possible, or an internal modulation type laser, in which a modulating element is incorporated in the oscillating light path, the modulator 3 may be omitted, and the laser beam is directly introduced into a beam expander 4 where it is subjected to expansion of the beam diameter while the rays of the beam are maintained in parallel. Furthermore, this laser beam with its beam diameter having been enlarged is then projected onto a polyhedral revolving mirror 5 having a single or a plurality of mirror faces. This polyhedral revolving mirror 5 is mounted on an axle supported by a bearing (e.g., air bearing) of high precision, and is driven by a motor 6 (e.g., hysteresis synchronous motor, D.C. servo-motor) rotating at a constant speed. The laser beam 12 which is directed horizontally at the polyhedral revolving mirror 5 is focussed on a photosensitive drum 8 in the form of a spot by means of a focussing lens 7 having an f-θ characteristic. In an ordinary focussing lens, there exists the following relationship with respect to a focussing position r on the image surface, when an incident angle of the light beam is taken θ:

$$r = f \cdot \tan \theta \quad (1)$$

where: f is the focal length of the focussing lens. The laser beam 12 which is reflected by the constant rotational speed of the polyhedral revolving mirror 5 as in the present embodiment varies its incident angle into the focussing lens 7 as a linear function with lapse of time. Accordingly, the moving speed of the focussed spot on the photosensitive drum 8 on the image forming surface varies non-linearly, hence it is not constant. In other words, at a point where the incident angle of the beam becomes large, the moving speed of the focussed spot increases, so that when a train of beam spots is drawn on the photosensitive drum 8 with the laser beam being kept "ON" for a certain definite time interval, the interval between them becomes wider at both ends thereof than at the center part thereof. With a view to avoiding such phenomenon, the focussing lens 7 is so designed as to have the characteristic represented by the following equation.

$$r = f \cdot \theta \quad (2)$$

This type of focussing lens is called an "f-θ lens". Further, when the parallel light beam is focussed in the form of a spot with the focussing lens, the minimum diameter of the spot ($d_{min}$) is given by the following equation:

$$d_{min} = f(\lambda/A) \qquad (3)$$

where: f is a focal length of the focussing lens; $\lambda$ is a wavelength of light beam used; and A is an incident opening of the focussing lens. It is understood from the above equation that, when the value of A is large in the case of f and $\lambda$ being constant, a smaller spot diameter ($d_{min}$) is obtained. The beam expander as described in the foregoing is used to produce such effect. Therefore, when the required minimum diameter ($d_{min}$) is obtainable by the beam diameter of the laser oscillator per se, the beam expander 4 can be dispensed with.

Beam detector 18 comprises a small incident slit and a photoelectric conversion element of quick response time (e.g., a PIN diode). This beam detector 18 detects a position of the laser beam 12 to be swept, by the detected signal of which a timing for introducing an input signal into the modulator 3 to impart desired light information onto the photosensitive drum is determined, whereby errors in split precision on each reflection surface of the polyhedral revolving mirror 5 and discrepancy in synchronism of the horizontal signal due to irregularities in the revolution can be remarkably lessened, an image of good quality can be obtained, and, at the same time, the permissible range of precision (or tolerance in precision) required of the polyhedral revolving mirror 5 and the driving motor 6 is relaxed to make it possible to manufacture the device at a cheaper cost.

Thus, the modulated and deflected laser beam 12 is irradiated on the photosensitive drum 8, and, after it is visualized by the electrophotographic process, the image is transferred onto ordinary paper, fixed thereonto, thus producing a hard copy.

2. Image Information Recording

Referring now to FIG. 2, the printing section 20 of the image information recording device according to the present invention will be explained.

As a first embodiment, the electrophotographic process as described in Japanese Patent Publication No. 42-23910 corresponding to U.S. Pat. No. 3,666,363 and Japanese Patent Publication No. 43-24748 corresponding to U.S. patent application Ser. No. 563,899, filed July 8, 1966 can be utilized. According to this electrophotographic process, the surface of an insulating layer of the photosensitive drum 8 consisting essentially of an electrically conductive substrate 8a, a photoconductive layer 8b, and an insulating layer 8c (FIG. 7) is uniformly charged in advance by first corona discharger 9 either of a positive polarity or of a negative polarity to thereby produce an electric charge of a opposite polarity to the abovementioned charge polarity at the interface between the photoconductive layer and the insulating layer, or within the photoconductive layer, then the laser beam 12 is irradiated onto the surface of the abovementioned insulating layer to be electrically charged with simultaneous application of an A.C. corona discharge by means of an A.C. corona discharger 10 or D.C. corona discharge of an opposite polarity, and subsequently a pattern due to differences in the surface potential caused in accordance with dark and bright patterns of the abovementioned laser beams 12 is formed on the abovementioned surface of the insulating layer followed by uniform exposure on the entire surface of the abovementioned insulating layer to form thereon an electrostatic latent image of high contrast. Further, the abovementioned electrostatic latent image is developed in a liquid developing device 13 with a developer consisting principally of charged color particles render it visible. Excess liquid developer is removed upon application of a corona discharge by corona discharger 17, after which this visible image is transferred onto an image transfer material 11 such as paper, etc. by utilization of an internal or external electric field which may be supplied by corona discharge 14. Subsequently, this transferred image is fixed by means of a fixing device 15 such as an infra-red lamp, a heated plate, and so on to obtain an electrophotographic printed image. On the other hand, after the image transfer operation has been completed, the surface of the abovementioned insulating layer is cleaned by a cleaning device 16 to remove residual charged particles of the color developer thereon so as to enable the photosensitive drum 8 to be repeatedly used for subsequent printing operations.

In the following, detailed explanations will be given in reference to FIGS. 5A and 5B on the phenomena taking place with the photosensitive body, when the electric charge on the surface of the insulating layer of the photosensitive body of the afore-described first embodiment which has been uniformly charged beforehand is attenuated by the A.C. coron discharge, in particular, with simultaneous irradiation of the laser beam thereonto.

Figure 5A:
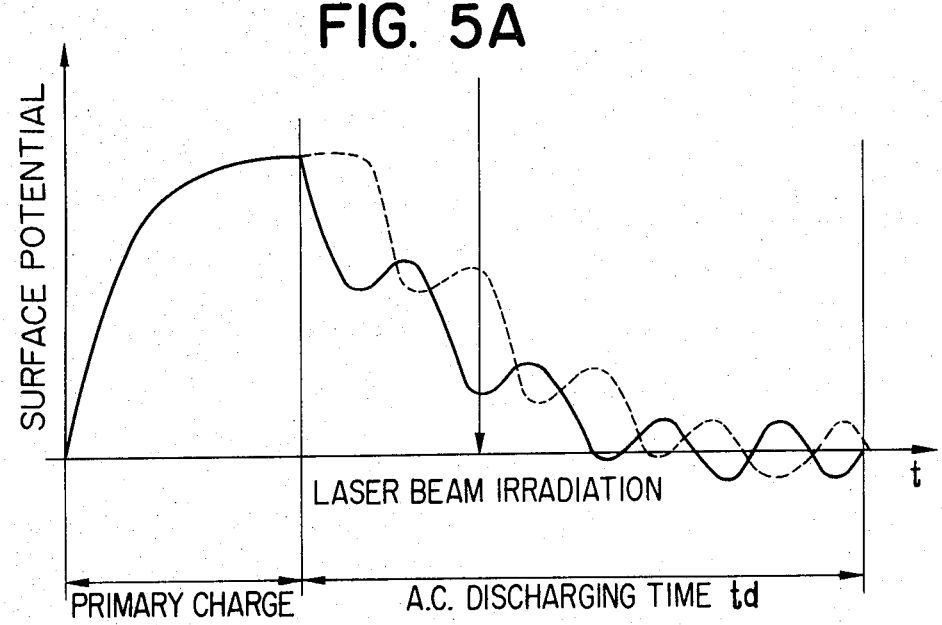
FIGS. 5A and 5B are respectively graphical representations showing variations in the surface potential of the insulating layer of the photosensitive body.
Figure 5B:
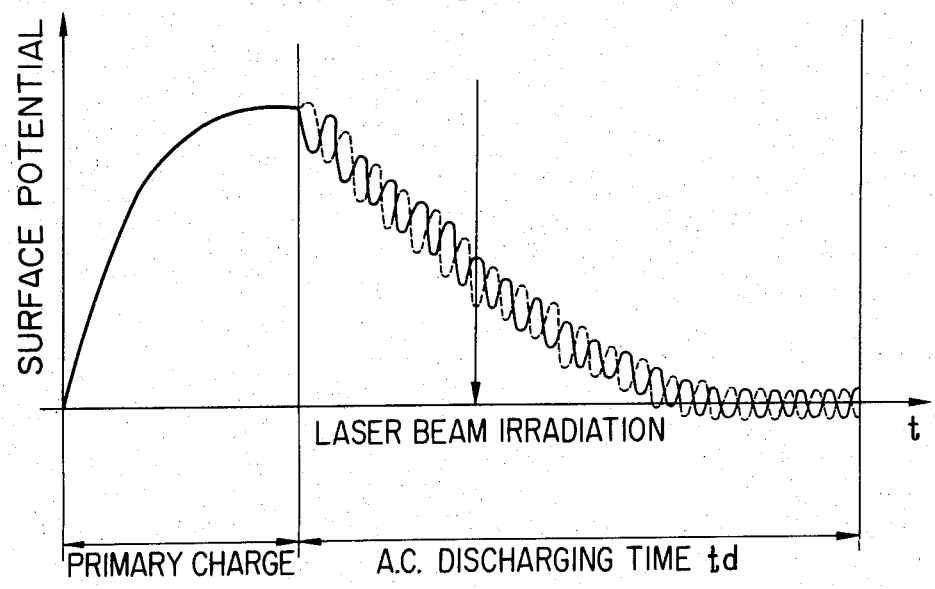

FIG. 5A indicates a varying state of the surface potential on the insulating layer of the photosensitive body, when the A.C. frequency of the corona discharge is relatively low. In this case, the electric potential at the time of the A.C. discharge on the abovementioned insulating layer surface can take an intermediate value between a curve in solid line and a curve in dotted line depending on the difference in phase of the alternating current voltage. On the other hand, irradiation of the laser beam takes place in an extremely short span of time in a particular place on the photosensitive body, e.g., 150 nanoseconds in this first embodiment. On account of this, the electric potential of the electrostatic latent image to be obtained after the overall exposure becomes constant due to the difference in the electric potential on the surface of the above-mentioned insulating layer at the time of the laser beam irradiation in spite of the fact that the amount of irradiation of the abovementioned laser beam is constant. Accordingly, there inevitably occurs irregularities on the developed image in synchronism with the alternating current frequency. This phenomenon does not occur when the process is applied to reproduction machines, etc., since, in this case, the overall exposure is conducted throughout the alternating current discharge region to equilibrate influence due to the phase difference.

When the frequency of the A.C. discharge is increased for the purpose of eliminating this irregularity in thd developed image (vide: FIG. 5B), there takes place no change in the overall discharging time, but decrease in amplitude of variations in synchronism with the alternating current frequency of the surface potential of the abovementioned insulating layer. In this consequence, the difference in the potential on the surface of the insulating layer at the time of the laser beam irradiation becomes small, and the irregularity in the abovementioned developed image reduces to a practically negligible amount. This can be explained by way of an equivalent circuit shown in FIG. 6 which is composed of a voltage source E to be applied to the discharge electrodes of the A.C. corona discharger, a resistance Rc for the corona flowing between the discharge electrodes and the photosensitive body, and a static capacitance Cp of the photosensitive body when it is regarded as a load to the capacitance alone.

In this equivalent circuit, when the electric potential on the surface of the insulating layer immediately before conducting the alternating current discharge by the primary charge is taken Vo, and a voltage to be impressed across the A.C. corona discharge electrodes is taken $E=E_0\cos(wt+\theta)$, the surface potential Vp of the abovementioned insulating layer during the A.C. discharge will be represented by the following equation:

$$V_p = \frac{E_0}{\sqrt{(WC_pR_c)^2 + 1}} \{ \sin(wt + \theta + \phi) - \sin(\theta + \phi) \cdot \exp(-\frac{t}{C_pR_c}) \} \quad (4)$$

$$V_o \exp(-\frac{t}{C_pR_c})$$

$$\phi = \tan^{-1}(\frac{1}{WC_pR_c})$$

From equation (4), the discharge time is given by the second term of the right side, the time constant $\tau$ of which is $C_pR_c$. Also, the amplitude of variation due to the frequency in the A.C. corona discharge is given by the first term of the same side as follows:

$$\frac{E_0}{\sqrt{(wC_pR_c)^2 + 1}}$$

Figure 6:
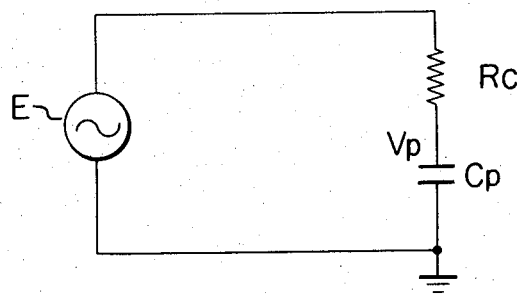
FIG. 6 is an equivalent circuit for carrying out alternating current discharge on the insulating layer of the photosensitive body.
Figure 7:
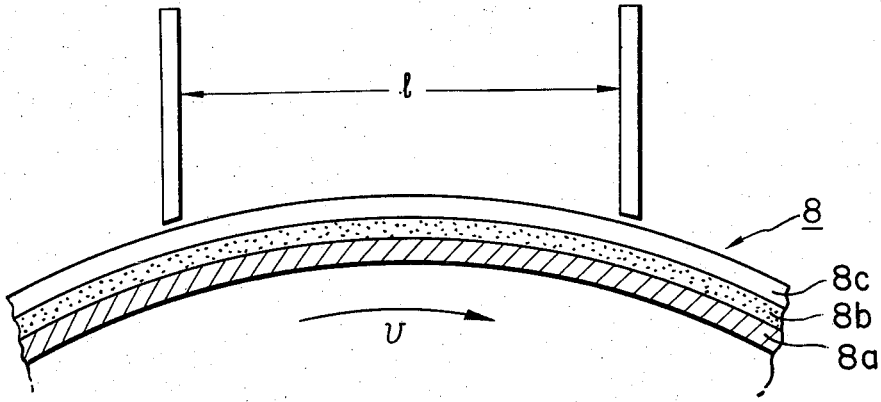
FIG. 7 is an enlarged partial view of the printing section 20 to be subjected to the alternating current discharge based on the equivalent circuit in FIG. 6 above.

Also, the A.C. discharging time td will be given as follows:

$$td = l/v \quad (5)$$

where: v is a circumferential speed of the drum; and l is a width of the discharging region (FIG. 7). Further, a amount corresponding to the static capacitance Cp of the equivalent circuit shown in FIG. 6 is proportional to the surface area of the photosensitive body passing through the discharging region per unit time, as follows:

$$C_p = Av \quad (6)$$

where: A is a proportional constant.

Here, if it is assumed that sufficient discharge is carried out under the conditions of $C_p=C_{p1}$, $R_c=R_{c1}$, and $v=v_1$, the time constant of the discharge in equation (4) will be represented as follows:

$$\tau_1 = C_{p1}R_{c1} \quad (7)$$

At this time, the amplitude $W_0$ of variations due to the A.C. discharge frequency $w_0$ is represented as follows:

$$W_0 = \frac{E_0}{\sqrt{(w_0 C_{p1} R_{c1})^2 + 1}} \quad (8)$$

Assume that this amplitude $W_0$ is sufficiently large so as to cause the irregular density in the abovementioned developed image. By taking $w=w_1 (w_1 > w_0)$, the following relationship will be established:

$$W_1 = \frac{E_0}{\sqrt{(w_1 C_{p1} R_{c1})^2 + 1}} < \frac{E_0}{\sqrt{(w_0 C_{p1} R_{c1})^2 + 1}} = W_0 \quad (9)$$

whereby $W_1$ is sufficiently small as not to cause the abovementioned irregularity in density.

Thus, by varying the frequency of the A.C. corona discharge, the abovemenioned irregular density in the developed image can be removed without changing the discharging time.

Next, assume that the circumferential speed of the drum is $v=\alpha v_1 = v_2$. In this case, the following relationship is established:

$$C_{p2} = \alpha C_{p1} \quad (10)$$

From the above, the discharging time will be represented by the following equation:

$$td_2 = \frac{l}{v_2} = \frac{l}{\alpha v_1} = \frac{td_1}{\alpha} \quad (11)$$

$$td_1 = \frac{l}{v_1}$$

Accordingly, for the discharge operation to be completely carried out within the discharging time $td_2$, the discharging time constant should be as follows:

$$\tau_2 = C_{p2} \cdot R_{c2} = \frac{\tau_1}{\alpha} = \frac{C_{p1} \cdot R_{c1}}{\alpha} \quad (12)$$

Since $C_{p2}=\alpha C_{p1}$, the following relationship should be established:

$$R_{c2} = \frac{R_{c1}}{\alpha^2} \quad (13)$$

In practice, the variation in Rc can be attained by changing the distance between the discharge electrode wires and the photosensitive body. In this case, the amplitude $W_2$ of variations derived from the abovementioned A.C. corona discharge frequency will be represented as follows:

$$W_2 = \frac{E_0}{\sqrt{(w_2 C_{p2} R_{c2})^2 + 1}} \quad (14)$$

From the above equation, the condition of $w_2$, under which $W_2$ equals $W_1$ is found, and the following relationship will be established:

$$w_2 C_{p2} R_{c2} = w_1 C_{p1} R_{c1} \quad (15)$$
$$\therefore w_2 = w_1 \cdot \frac{C_{p1} \cdot R_{c1}}{C_{p2} \cdot R_{c2}} = \alpha w_1$$

From the equation (15), it will be found necessary to apply an A.C. corona frequency larger than a certain value in order for the abovementioned irregularity in the developed image not to take place, and this value is proportional to the circumferential speed of the drum. In the practice of this first embodiment, the following parameters were used.

1. Circumferential speed (v) of the drum      30 cm/sec.

| | | |
|---|---|---|
| 2. Area of discharge region | 3 cm × 30 cm | |
| 3. Static capacitance (C) of photosensitive plate | 5 pF/cm² | |
| 4. Current for A.C. discharge | 75 μA rms | |
| 5. Applied voltage | 7 kV | |
| 6. Discharge frequency (f) | 1 KHz | |
| 7. Electrostatic contrast | approx. 500V | |

The development is of a reversal type using a liquid developer.

From the experiments using the abovementioned parameters, the irregularity in the developed image could be removed under the following condition of the A.C. discharge frequency (f):

$$f \geq \frac{v}{0.03} \text{ Hz} \tag{16}$$

This means that the pitch due to the A.C. corona discharge frequency on the photosensitive drum is 0.3 mm. Accordingly, the effect of the above equation (16) can be represented more generally by the following relationship:

$$f \geq \frac{v}{P} \tag{17}$$

where P is a constant to be determined by the static capacitance of the photosensitive body, width of the discharge region, conditions for the development, etc., and in the case of the abovementioned first embodiment, the value is 0.03.

As a second embodiment, the electrostatic latent image forming process in the electrophotography as described in Japanese Patent Publication No. 42-19748 can be utilized. According to this process, a photosensitive plate consisting essentially of an electrically conductive substrate, a photoconductive layer, and an insulating layer is utilized. The surface of this insulating layer is uniformly charged beforehand by the primary corona discharge of a positive or negative polarity to thereby produce an electric charge of an opposite polarity to the abovementioned charge polarity either at the interface between the photoconductive layer and the insulating layer, or within the photoconductive layer, then the A.C. corona discharge is applied to the abovementioned surface to be charged to attenuate the electric charge on the surface of the abovementioned insulating layer, and subsequently the abovementioned laser beam as the information signal is irradiated thereonto to form an electrostatic latent image in accordance with brightness and darkness of the laser beam on the insulating layer surface. The remaining process steps from development of the electrostatic image onward are exactly same as in the first embodiment.

It is also possible to carry out by the corona discharger 10 a D.C. corona discharge of an opposite polarity with respect to the charge polarity of the corona discharger 9 shown in FIG. 2.

3. Preferred Laser and Photosensitive Element Combinations

The photosensitive body and the laser oscillator used in the afore-described first and second embodiments are as follows.

Combination A (1) Laser oscillator:
He-Ne gas laser (wavelength of 632.8 mμ)
(2) Photosensitive Body:
A photosensitive substance prepared by first adding 10 g of vinyl chloride to 90 g cadmium sulfide activated by copper followed by further addition of a small quantity of thinner was applied onto an aluminium foil of approximately 100 microns thickness by a spray-coating method to a thickness of approximately 70 microns. Subsequently a thin film of Mylar (a trademark for a polyester film of E. I. du Pont de Nemour & Co., U.S.A.) in a thickness of approximately 25 microns was intimately laminated and adhered onto the coated photoconductive surface with aid of an adhesive agent to thereby obtain the photosensitive plate, and then this photosensitive body was wound around the drum made of aluminium. With this photosensitive body, the charge polarity of the abovementioned first electric charge becomes "positive".

Combination B (1) Laser Oscillator:
He-Cd laser (wavelength of 441.6 mμ)
(2) Photosensitive Body:
On an aluminium substrate, there was vacuum-evaporated tellurium (Te) to a thickness of about 1 micron to form the Te layer, then there was further vacuum-evaporated selenium (Se) containing 15% of Te over this Te layer to a thickness of about 90 microns, the top surface of which was coated with a transparent insulative resin to a thickness of about 30 microns followed by hardening the same. With this photosensitive body, the charge polarity of the abovementioned first charge becomes "negative".

It should also be noted that various kinds of laser beam sources which have so far been published and which will be published in the future are applicable to the abovementioned first and second electrostatic latent image forming processes. Anyway, it is important to devise the best combination of a laser beam source and a photosensitive body, wherein the laser wavelength and the spectral sensitivity characteristic of the photosensitive body are well matched.

For the laser source, the following can be used:
1. Argon (Ar) gas laser
2. Krypton (Kr) gas laser
3. Ar+Kr gas laser
4. (visible) semiconductor laser
5. Pigment laser
6. Double wavelength conversion of infrared laser beam by a non-linear crystal (such as YAG laser, semiconductor laser)

Electronic Processing and Control Circuitry

In the following, process steps starting from the receipt of pattern and character information from a computer to the preparation of a desired hard copy of such received image information by use of the device described in the foregoing embodiments will be explained in reference to FIG. 3.

Information from a computer 21 is input to an interface circuit 22 of the recording device directly or through a memory medium such as magnetic tapes, magnetic discs, and so on. Various instructions from the computer are deciphered and executed in an instruction circuit 24, while data are stored in a data memory 23 for a certain predetermined period. The mode of the data memory is given in the form of a binary code in the case of character information, and in the case of pattern information, it is given in the form of either a datum of the original image unit constituting the pattern, or a line datum constituting such pattern (so-called vector data). These modes of the data memory are designated in advance of the data memory operation, and the instruction circuit 24 controls the data memory 23 and a line data generator 26 in accordance with the thus designated mode so as to process the data to be memorized. The line data generator 26 generates final data for one scanning line. That is to say, when the data are given in the form of a character code, the character patterns are read out of the character generator 25 to buffer the character patterns arranged for one sentence line, or the character code for one sentence line is first buffered and then the character patterns are sequentially read out of the character generator 25, whereby the data for modulating the laser beam for one scanning line are prepared in sequence. Even when the data is pattern information, data for modulating the laser beam for one scanning line are produced bit by bit by converting the data into the scanning line data. The data for one scanning line are alternately input by the controlling action of a buffer switch control circuit 29 into the first line buffer 27 and second line buffer 28 consisting of a shift register, etc. having a number of bits equal to the number of original image patterns for one scanning line.

Furthermore, the date in both line buffers 27 and 28 are read out bit by bit for one scanning line by the buffer switch control circuitry 29 and in synchronism with a beam detection signal derived from the beam detector means 32 (beam detector 18 of FIG. 1) as a trigger signal, and thereafter adding to the modulator controlling circuit 31 coupled to the laser beam modulator 3. The buffer switch control circuit 29 synchoronizes through the control circuit 34, the operation of motor 6 driving the scanning mirror 5 (FIG. 1) while one reflection surface of the mirror 5 (FIG. 1) is scanning the photosensitive drum along a direction perpendicular to the rotating direction of the drum, the data for one scanning line stored in the line buffers are added to the modulator, whereby bright and dark patterns corresponding to one scanning line are given on the photosensitive drum 8. From the line buffers 27 and 28, the line data are alternately read out by the control of the buffer switch control circuit 29 which is driven in response to the beam detection signal derived from the beam detection means 32. This time relationship is shown in FIG. 4A. As is clear from the waveform representations in this drawing figure, while read-out operation is being conducted in one line buffer, write-in operation is being carried out in the other line buffer. By this system, all the data can be added to the modulator without failure, when an interval between one reflection surface and the subsequent reflection surface is extremely short for the polyhedral revolving mirror to sweep the surface of the photosensitive drum. During scanning of one scan-line, the photosensitive drum continues its rotation at a constant speed so as to shift for an appropriate scanning line spacing.

The printer control circuit 33 receives "Start" instructions from the instruction circuit 24, causes the printer to commence operation, and, at the same time, returns a "printer ready" signal to the instruction circuit 24. When the signal is added to the modulator 3, and the first data at the first page are written in on the photosensitive drum, a recording paper 11 is fed out of a paper feeding mechanism at a matched timing so that the written-in data may appropriately be transferred at the head part of the transfer paper at a predetermined transfer position.

Thus light from the laser oscillator (energized by the power source 30) is modulated by the modulator 3 in accordance with the character and pattern information from the computer 21 and a clear, hard copy of same is formed on recording paper of ordinary quality.

Next, method of output with enlarged characters and patterns will be described in detail.

Embodiment For Producing Enlarged Characters

In place of reading out data by alternately switching over the line buffers 27 and 28 for each scanning operation as described above, when the pattern and character information data are enlarged, the scanning is repeated for each line buffer in accordance with the magnification so as to read out the data, whereby it becomes possible, during constant drum rotation, to enlarge these output patterns, characters, etc. by integraly multiplying them in the direction orthogonal to the scanning direction thereof.

Subsequently, of the data for one scan within each line buffer, only the object image signal is read out at a bit rate corresponding to a ratio and an arbitrary magnification (the magnification may be either the same or different in both vertical and horizontal directions), whereby any arbitrary portion of the data such as patterns, characters, etc. in the line buffer may be enlarged arbitrarily in the scanning direction and at a constant scanning speed.

Thus, as stated in the foregoing, by use of one and the same data, it is possible to produce an output as a result of enlarging or deforming the patterns, characters, etc. in both vertical and horizontal directions independently of the other.

FIG. 8A shows one example of an original character output and an enlarged and deformed output character. FIG. 4B indicates a time relationship between alternate reading-out and writing-in operations in the line buffers 27 and 28 at the time of enlargement and deformation of the pattern and character information.

Micro Deflection Embodiments

Figure 19:
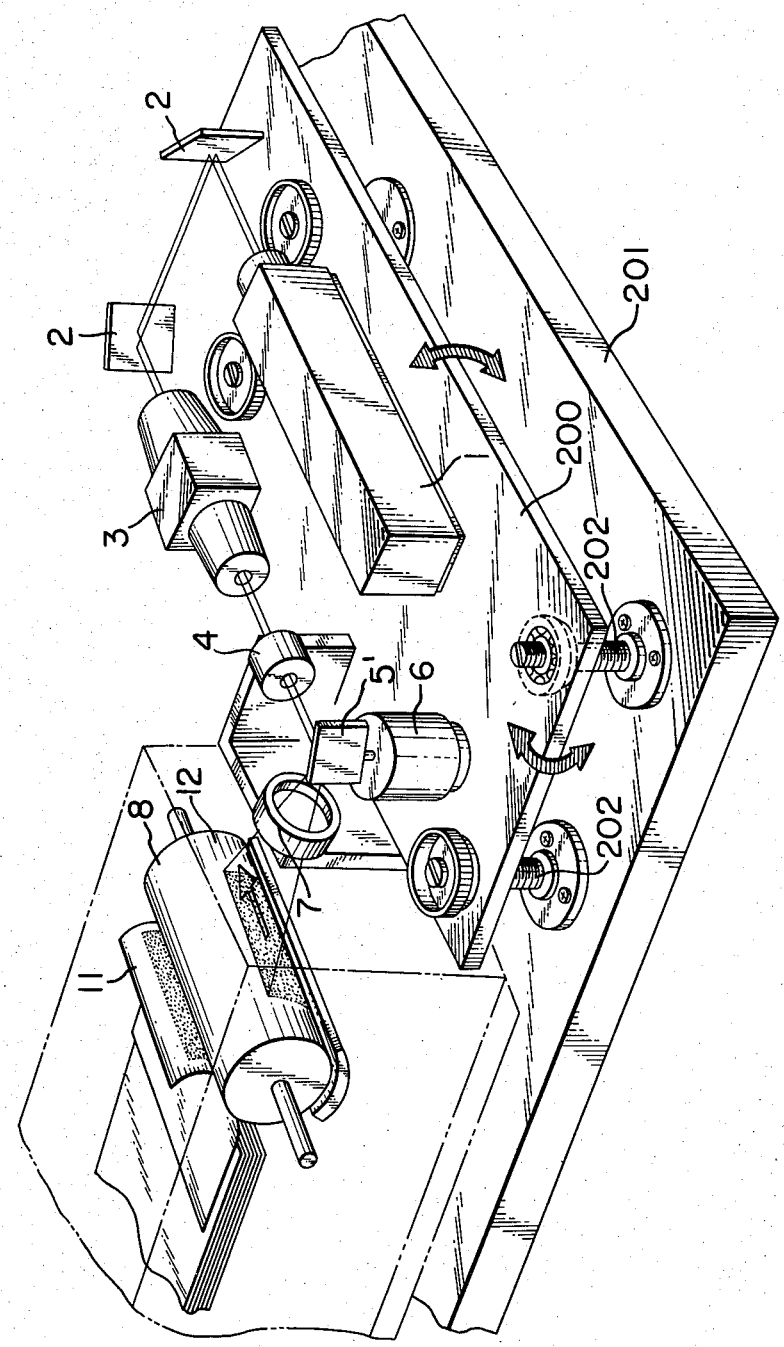
FIG. 19 is a perspective view of a device of the present invention for correcting the inclination in the scanning line.

In these embodiments, explanation will be made as to the mechanism wherein the principal scanning means of FIG. 1 is a galvano-mirror 5' as shown in FIG. 19 in place of the polyhedral revolving mirror 5.

The laser beam which has been emitted from the laser oscillator 1 is introduced to the input opening of a modulator-deflector 3 through the reflection mirrors 2. At this modulator-deflector 3, the laser beam is subjected to modulation of varying degrees from strong to weak modulations in accordance with an input signal into the modulator-deflector 3. The thus modulated laser beam from the modulator-deflector 3 is expanded in beam diameter by the beam expander 4, while the rays are maintained in parallel. The laser beam with its beam diameter having been enlarged is projected onto the galvano-mirror 5' having a mirror surface. The galvano-mirror 5' is driven by motor 6. The laser beam 12 swept at a constant speed in the principal scanning direction is focussed on the photosensitive drum 8 in the form of a spot through focussing lens 7 such as a f-$\theta$ lens, etc. The beam detector 18 detects the position of the laser beam to be swept with the detected signal and determines the timing for the start of the input signal into the modulator-deflector 3 to impart a desired light information pattern on the photosensitive drum. As shown in FIG. 1, this beam detector 18 is not limited to a definite signal position. For example, the beam position detection a signal can be obtained by projecting onto the galvano-mirror 5' a position detection light different from the laser beam 12 in a manner not to hamper the recording of the information onto the photosensitive drum 8 by the laser beam 12 by scanning a plurality of slits disposed on any appropriate position with the rotating galvano-mirror 5'. It is also possible that a part of the laser beam from the laser oscillator 1 be split by a semi-transparent mirror without it being modulated and used as the position detection beam, or that a part of a very small deflected light by a solid-state light modulator-deflector be split in a manner not to hinder the recording and used for the same purpose. Further, apart from the laser oscillator 1, another laser beam source may be used for the position detection, or diffraction gratings may also be used in place of the slits. Also, even in the case of using a lens having no f-$\theta$ characteristics, it is possible to obtain a similar effect by detecting a position of the laser beam in the principal scanning direction as mentioned above and adding a character pattern signal to the abovementioned solid-state light modulator-deflector in synchronism with the detected result, or by controlling rotation of the galvano-mirror 5' with a previously programmed method in accordance with the focussing characteristic of the focussing lens. By such arrangement, discrepancy in synchronism of the horizontal signal due to irregularity in vibration of the galvano-mirror can be reduced to a great extent to enable a good quality image with a constant character position, and, at the same, time, the permissible scope of precision required of the galvano-mirror 5' and the motor 6 is relaxed with the result that the device can be manufactured at a cheaper cost.

As already mentioned, the modulated and deflected laser beam 12 is irradiated on the photosensitive drum 8 to form a latent image, and, after the image is developed by the electrophotographic process, it is transferred onto ordinary paper, fixed, and withdrawn as a hard copy. Incidentally, the functions and operations, etc. of the other mechanical parts are exactly the same as the afore-described embodiment except as noted below.

In the following, the time relationship of the operation in this embodiment will be explained in reference to FIG. 4C.

Figure 8B:
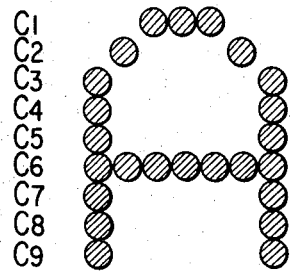
Figure 9:
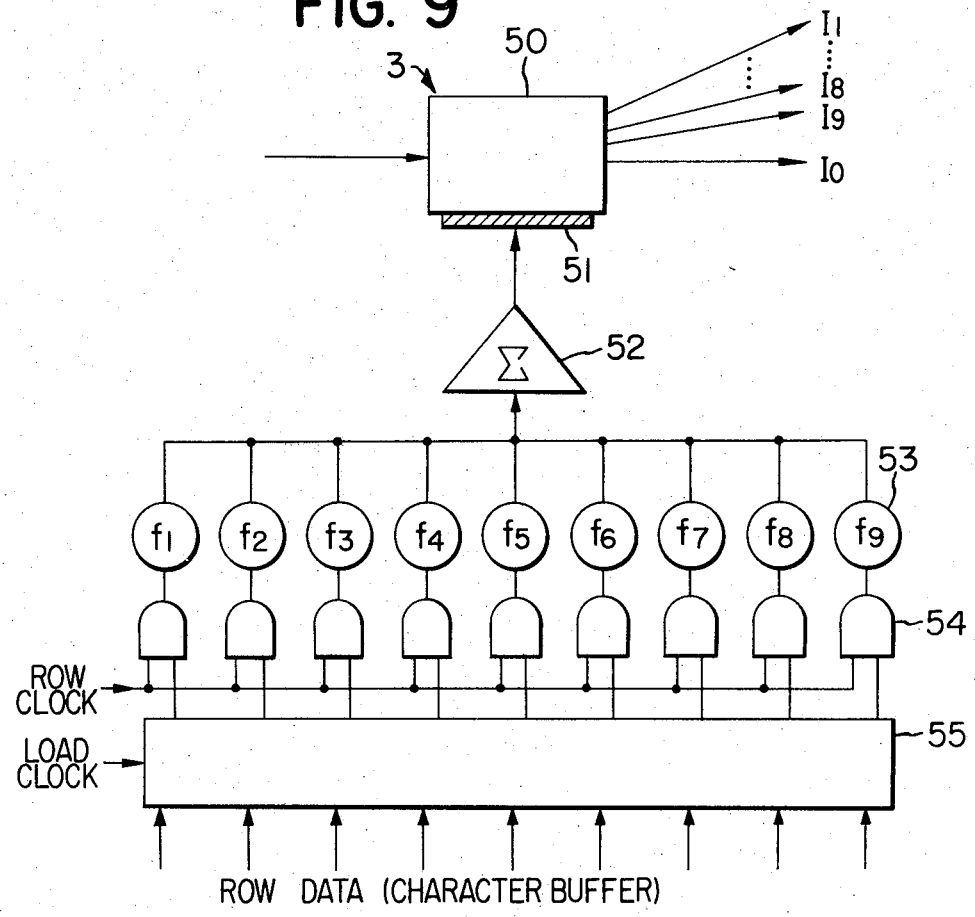
FIG. 9 is a block diagram explaining an alternate system of the present invention, wherein supersonic waves of nine different frequencies are simultaneously imparted to a light modulation-deflection element.
Figure 10:
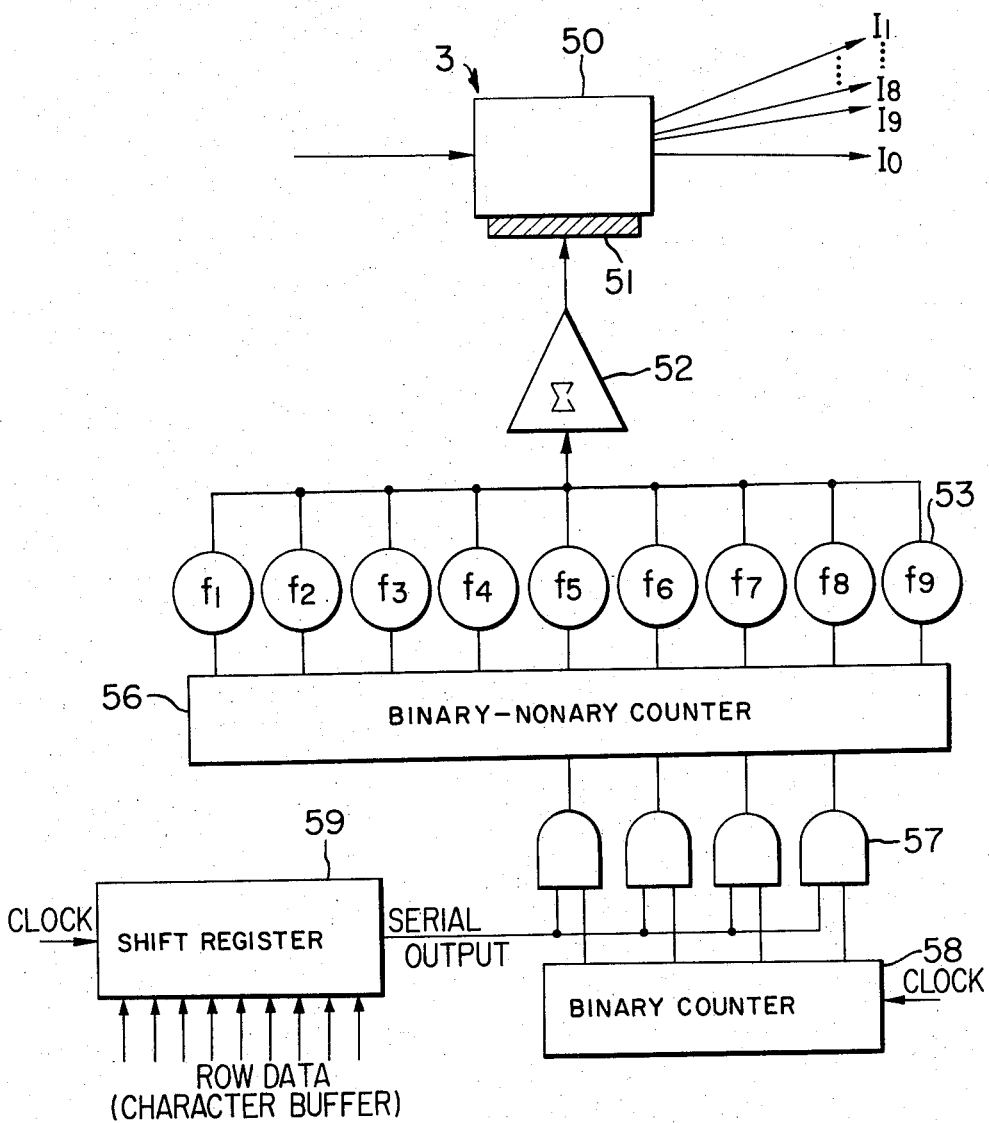
FIG. 10 is a block diagram explaining still another alternate system of the present invention, wherein supersonic waves of nine different frequencies are imparted to the light modulation-deflection element in time sequence.
Figure 11:
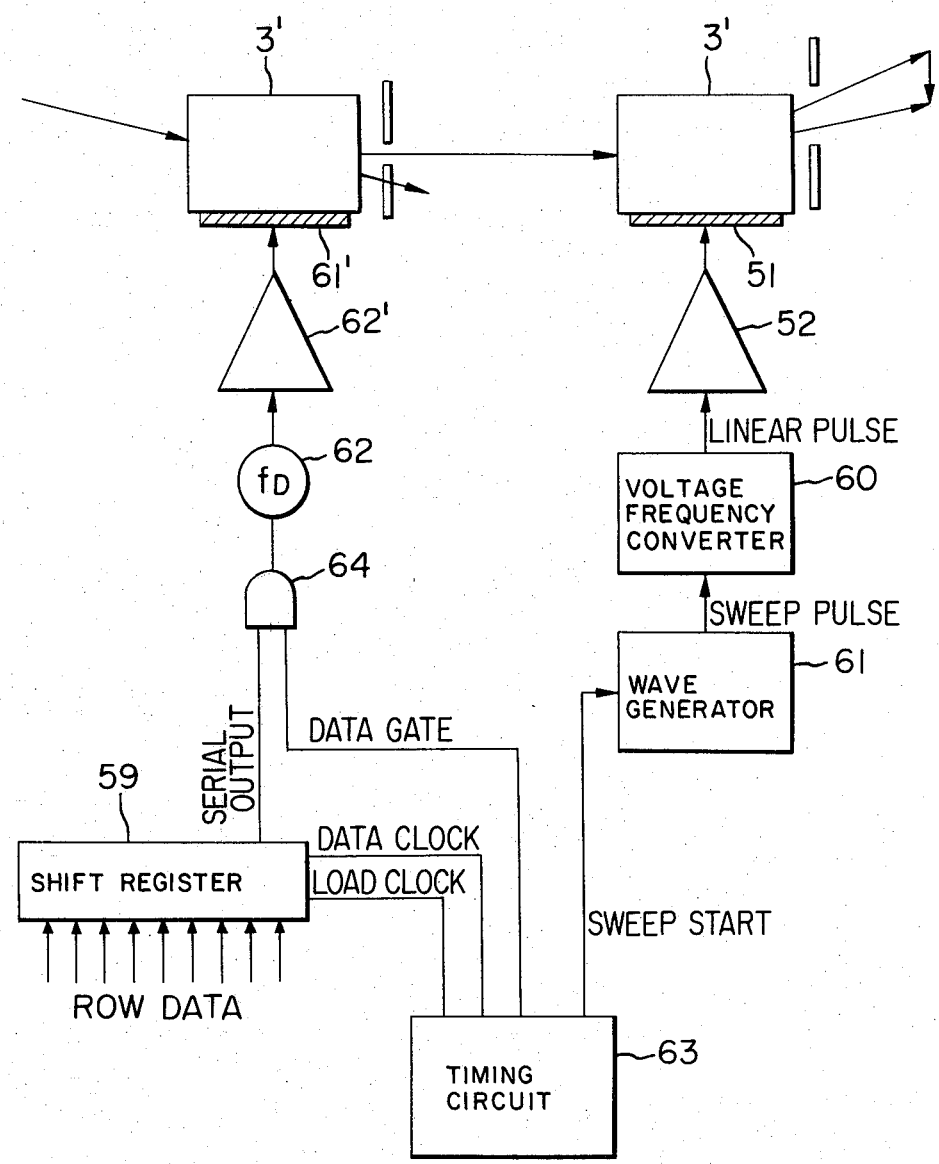
FIG. 11 is a block diagram explaining another system of the present invention, wherein a supersonic wave whose frequency varies linearly with lapse of time is imparted to a deflector so as to deflect the light beam in the travelling direction of the supersonic wave.

First of all, explanation will be made as to how the character signal emitted from the character buffer is added to the modulator, and the laser beam is modulated and deflected. For the purpose of explanation, the character information is constructed with a 7×9 dot grid, and an element utilizing the acoustic-optical effect is employed as the light modulator-deflector. An example of the character construction is shown in FIG. 8B. FIG. 9 indicates a system, wherein supersonic waves of nine different frequencies are simultaneously imparted to the light modulator-deflector 3. FIG. 10 shows another system, wherein supersonic waves of the different frequencies are added to a modulator-deflector 3 in time sequence. FIG. 11 illustrates a system, wherein a supersonic wave having a linearly varying frequency is added to a separate deflector 3.

As has already been known, the deflection angle due to the acoustic-optical effect varies depending on the frequency of the supersonic wave. It has also been known that, when supersonic waves having a plurality of frequencies are simultaneously added, the deflected light beam is split in the direction of a plurality of deflected angles.

In the system shown in FIG. 9, oscillators $f_1$ through $f_9$ which emit nine different kinds of frequencies corresponding to 9 dots for one line are subjected to "ON" and "OFF" in accordance with existence and non-existence of the dots for one line, and these plurality of frequencies are composed in the mixing amplifier 52 to amplify the thus composed frequency, after which it is imparted to the electro-sonic conversion element 51. In the line data register 55, data for nine dots for each line are input from the character buffers 27 and 28 in a parallel manner (FIG. 3).

In the example system shown in FIG. 10, data corresponding to the dots for one line are parallelly input into the shift register 59, from which they are added sequentially to the gate circuit 57 dot by dot. Also, the output from the nonarized binary counter 58 are added to the binary-nonary decoder 56, whereupon the oscillators $f_1-f_9$ which oscillate nine kinds of frequencies are sequentially selected, and the determination of whether they oscillate at the selected timing or not is governed by the data output from the shift register 59. The output from the oscillators $f_1-f_9$ are amplified by the mixing amplifier 52, and then added to the electro-sonic conversion element 51 attached to the acoustic-optical element 50 of modulator deflector 3. Thus, bright and dark patterns following a direction of the character line (i.e., a line wherein the character patterns exist in the vertical direction) are given on the photosensitive drum 8. At the same time, as the photosensitive drum 8 is scanned in the lateral direction by the galvano-mirror 5', when the modulation and deflection are carried out in sequence in the abovementioned direction of the character line, one character can be exposed with repetition of the operations for seven times. In a similar manner, the characters for one line can be exposed on the photosensitive drum 8. In the course of this scanning operation, the photosensitive drum 8 continues its constant rotation to shift for an appropriate line space.

The printer control circuit 33 (FIG. 3), when it receives a "start" instructions from the instruction circuit 24, causes the printer operation to commence, and, at the same time, returns a "printer ready" signal to the instruction circuit 24. When the signal is added to the modulator 3, and initial data at the first page are written on the photosensitive drum 8, recording paper 11 is fed out of the paper feeding mechanism by taking an appropriate timing so that these written-in data may be transferred onto the head part of the paper at their transfer position. Thus, the character and pattern information from the computer 21 is printed on an ordinary paper as a clear hard copy.

Figure 13A:
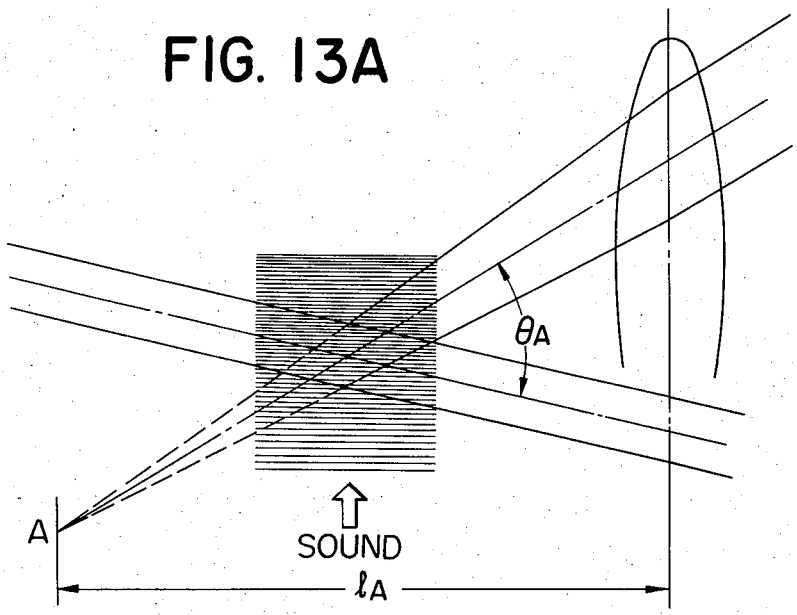
FIGS. 13A and 13B are respectively diagrams explaining the propagation path for the light beam deflected by the system shown in FIG. 11.
Figure 13B:
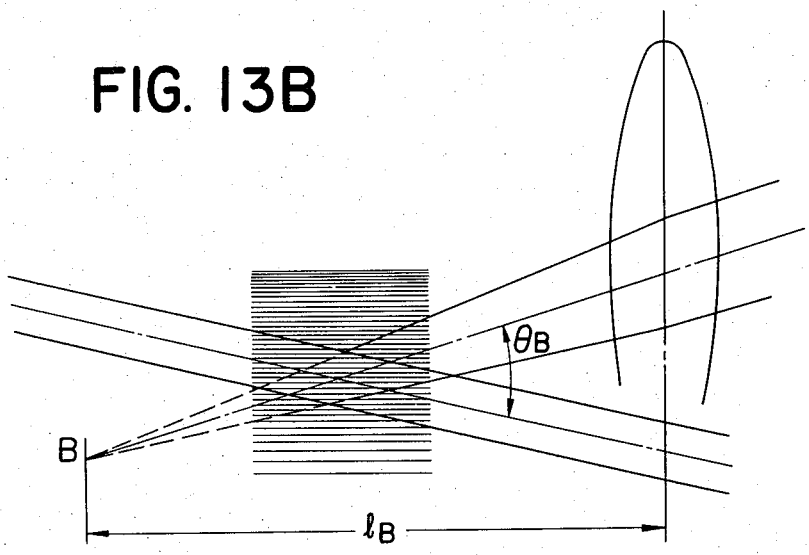

FIG. 11 indicates a system, wherein a supersonic wave having linearly varying frequency with lapse of time is added to a deflector 3 composed of a acoustic-optical element so as to deflect the laser beam in the travelling direction of the supersonic wave. When the supersonic wave whose frequency varies with lapse of time is added to the deflector 3, there is formed within the deflector 3 a phase lattice, the lattice pitch of which linearly varies in the travelling direction of the supersonic wave due to the photo-elastic effect of the supersonic wave. By this phase lattice, the laser beam spreads out within a certain time period in the travelling direction of the supersonic wave in a sector form as if it were radiated from a certain definite point A within a plane including the laser incident direction. As time goes by, the frequency varies, and, at a certain time instant tA, the laser beam is deflected as if it spread from the point A, wherein it assumes a deflection angle $\theta A$ (FIG. 13A). Further, at another time instant tB, the laser beam is deflected as if it spread from the point B, wherein it assumes a deflection angle $\theta B$ (FIG. 13B). Here, if there exists a relationship of the FIG. 13A frequency being higher than the FIG. 13B frequency, the relationship between their deflection angles becomes $\theta A > \theta B$. Also, if the frequency variation with lapse of time is linear, the points A and B are in their respective positions represented by the relationship of $lA = lB$. Accordingly, when a cylindrical lens having a focal length of $lA (=lB)$, it can be brought back to the original parallel beam as shown in the drawing. In this way, deflection of the laser beam becomes possible.

Figure 12:
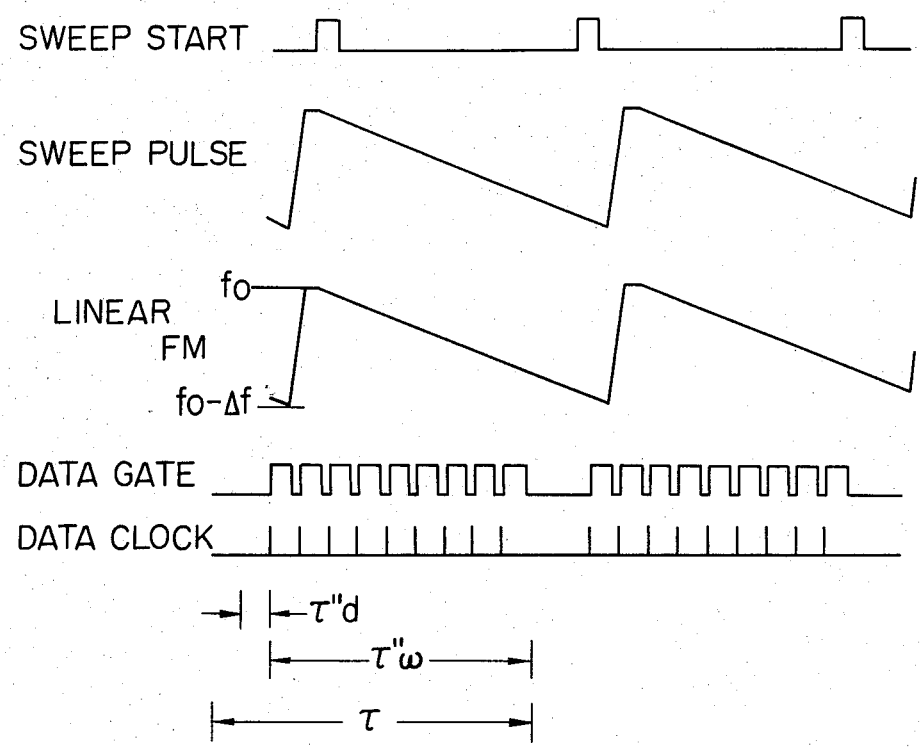
FIG. 12 shows various signal waveforms at various sections in the system shown in FIG. 11.

FIG. 11 indicates the method of constructing the character by the afore-described system. FIG. 12 shows the time relationship among various signals in FIG. 11. That is, when a "sweep start" signal is emitted from the timing circuit 63, a "sweep pulse" signal having a sawtooth voltage waveform is generated from the sawtooth wave generator 61. Then, at the voltage-frequency converter 60, a frequency which varies linearly with lapse of time is generated in accordance with the sweep pulse waveform. This frequency signal is amplified by the amplifier 52, and impressed on the electrosonic conversion element 51 attached to the acoustic-optical deflector 3''. This arrangement is shown schematically in dotted outline in FIG. 3. Thus, as soon as the laser beam enters into the deflector 3, it is brought to a state of being deflected. However, if the time period of from arrival of the frequency $f_0$ at the end of the opening of the laser beam (the time required for the arrival being taken as $t_0$) to completion of filling of the entire opening of the laser beam with the phase lattice of the supersonic wave is taken as $\tau'$, the laser beam does not spread in the sector form during the time interval of $t_0 \sim t_0 + \tau'$. Accordingly, it is necessary that the laser beam modulated by the modulator 3' be projected into the deflector after lapse of the time $t_0 + \tau'$. In this case, there is a relationship of $\tau' = A/v$ (where: A is a diameter of the beam opening; and v is a sonic speed of the supersonic wave). According to this relationship, nine dots information for one line are input in parallel into the shift register 59, which is then sent out in sequence during $\tau'\omega$ with a delay of the time $\tau'$. And, in accordance with the binary code "1" and "0" of this information, the oscillations from the oscillator 62 are subjected to "ON" and "OFF", and the signal from the oscillator 62 is amplified by the amplifier 62', thereafter, it is added to the modulating element 3' as a supersonic wave through the electro-sonic conversion element 61'.

Thus, bright and dark patterns following a certain line of the character pattern in the direction of the character arrangement (vertical direction) is applied onto the photosensitive drum 8. At the same time, as the photosensitive drum is scanned in the lateral direction by the galvano-mirror 5', one character can be exposed by carrying out modulation and deflection in the above-mentioned direction of the character line for seven consecutive times. In the same manner, the characters for one line are exposed on the photosensitive drum 8. During this operation, the photosensitive drum 8 continues its constant rotation to shift for an appropriate line space.

The three systems for carrying out the micro-deflection of the laser beam as have been explained so far with respect to the embodiments according to the present invention have their own long and short, as will be explained in the following.

(A) A system wherein supersonic waves having a plurality of frequencies are added to the sound-optical element in time sequence.

Advantage The frequency to be simultaneously generated is single, hence electrical circuit can be constructed relatively simple.

Disadvantage Number of dot (amount of information to be recorded in a unit time is small.

(B) A system wherein supersonic waves having a plurality of frequencies are added simultaneously.

Advantage A plurality of dots can be recorded simultaneously, if a laser oscillator having a large laser power is used. Hence, the recording speed remarkably improves.

Disadvantage Since the laser beam is split, light amount in each dot varies depending on the density of dots which are placed in "ON" state. Also, a plurality of frequencies are multiplexed and, an amplifier of large output is required.

(C) A system wherein a supersonic wave, the frequency of which varies linearly with lapse of time, is added.

Advantage High speed recording can be effected with relatively little power.

Disadvantage Unless the rate of frequency variation is constant, the opening angle of the sector, within which the laser beam spreads, varies with the consequence that no parallel beam can be resolved with ordinary parallel light beam resolving lens, that is, a lens having variable focal length is required.

In the following, detailed explanations will be made as to the abovementioned recording speed (or amount of information-number of dots- to be recordable within a unit time).

As an evaluation of the recording speed, there is calculated a relationship between the number of resolving points N which can be resolved in one scanning of the micro-deflection and the maximum value $f^{max}$ of the frequency for the micro-deflection. In general, the following relationship has been established in a supersonic wave deflection element using a sound-optical element:

$$N = \frac{\tau'' \cdot \Delta F}{k} \quad (18)$$

where: $\tau''$ is the time required for passage of a supersonic wave through the diameter (opening) of the incident laser beam; $\Delta F$ is a varying width of supersonic wave frequency to deflect one scanning; and k is a constant to be determined by the shape of the laser beam cross-section and light intensity distribution, which takes $k = 1$ in the case of uniform distribution, and $k = 1.27$ in the case of Gauss distribution.

The abovementioned relationship may be applied to each of the afore-described three particular situations (A), (B) and (C) as follows.

In the system (A), $$T \geq N \cdot \tau'' \quad (19)$$

(where: T is the time for one scanning) hence, $T^{min} = 1/f^{max}$.

From the equations (18) and (19), the following relationship can be obtained.

$$\frac{N^2}{T^{min}} = \frac{\Delta F}{k} \quad (20)$$

$$\therefore f^{max} = \frac{\Delta F}{kN^2} \quad (21)$$

When $\Delta F = 100$ MHz and $k=1$, the following results are obtained.

| N (number of resolving point) | 9 | 24 | 32 | 40 |
|---|---|---|---|---|
| $f^{max}$ (KHz) | 1235 | 173.6 | 97.7 | 62.5 |

In the system (B), $T \geq \tau''$  (22)

$$\therefore \frac{N}{T^{min}} = \frac{\Delta F}{k} \quad (23)$$

$$f^{max} = \frac{\Delta F}{kN} \quad (24)$$

When $\Delta F = 100$ MHz and $k=1$, the following results are obtained.

| N (number of resolving point) | 9 | 24 | 32 | 40 |
|---|---|---|---|---|
| $f^{max}$ (KHz) | 11111 | 4167 | 3125 | 2500 |

In the case of this system (B), the peak value $P^{max}$ of the supersonic wave input into the sound-optical element is:

$$P^{max} \propto N^2$$

For instance, where the supersonic wave input in the system (A) is 0.5 W, the supersonic wave input in the case of the system (B), where $N=40$, is calculated as $0.5 \text{ W} \times 40^2 = 800$ W.

In the system (C), $$T \geq \tau'' + \tau''\omega \quad (25)$$

(where: $\tau''\omega$ is a time wherein a signal is effectively drawn out of 1 scanning.)

$$\Delta F^* = \frac{T_{min}}{\tau''\omega} \Delta F = \Delta F (1 + \frac{\tau''}{\tau''\omega}) \quad (26)$$

(where $\Delta F^*$ is a frequency width varying within a time of $\tau'' + \tau''\omega$)

From the equations (18) and (26), $$N = \frac{\Delta F^*}{k}(T_{min} - \tau''\omega)$$

$$= \frac{\Delta F^*}{k} \cdot \frac{\tau''\omega}{T_{min}}(T_{min} - \tau''\omega)$$

Now, if $\tau''\omega = N \cdot \tau''_E$ (where: $\tau''_E$ is a pulse width of 1 dot), $$N = \frac{\Delta F^*}{k} \cdot \frac{N \tau''_E}{T_{min}}(T_{min} - N \cdot \tau''_E)$$

$$\frac{N}{T_{min}} - \tau''_E{}^2 \cdot \Delta F^* = \frac{\Delta F^* \tau''_E}{k} - 1$$

$$f_{max} = \frac{1}{N} \frac{1}{\tau''_E{}^2 \cdot \Delta F^*}(\frac{\Delta F^* \cdot \tau''_E}{k} - 1) \quad (27)$$

$$= \frac{f_E}{N}(1/k - \frac{f_E}{\Delta F^*})$$

$$f_E = 1/\tau''_E$$

When $\Delta F^* = 100$ MHz, $1/\tau''_E = 20$ MHz ($\tau''_E = 0.05$ μs), and $k=1$, the following results are obtained.

| N (number of resolving point) | 9 | 24 | 32 | 40 |
|---|---|---|---|---|
| $f^{max}$ (KHz) | 1778 | 677 | 500 | 400 |

The wattage for the supersonic wave input is the same as in the system (A). Accordingly, in the case of recording a pattern such as Chinese characters, wherein the number of dots in one row is approximately 40 or so, the system (C) is considered the most advantageous from the general point of view of these three systems (A), (B) and (C).

So far, explanations have been made with respect to the micro-deflection operation, wherein vertical scanning alone is conducted, and horizontal scanning is done by the principal scanning deflector which moves at a constant speed. However, when micro-deflection in the horizontal direction is also added, versatility in the recording operation increases to a great extent. That is to say, when micro-deflection is carried out stepwise in the horizontal direction, the character spacing, for example, can be varied. When this micro-deflection in the horizontal direction is conducted in a continuous manner, the shape of the character can be freely varied such as, for instance, it can be elongated in the sidewise direction or in the lengthwise direction. It is also possible to draw any arbitrary pattern by use of Lissajous' figure. Thus, the freedom of laser beam deflection, as compared with electron beam deflection in the CRT, can be improved to an appreciable extent.

Next, the afore-described systems of (A), (B) and (C) will be explained in reference to the accompanying drawing with respect to actual embodiments, wherein they are combined with the horizontal and vertical deflections. Note that, in both cases assumption is made as to writing a letter "A" with a 7×9 dot grid construction only by use of micro-deflection in both the X and Y directions. In reality, however, since the principal scanning is effected at a slower speed than the micro-deflection by a few places, the scanning component parallel to the principal scanning is the result of a sum of the micro-deflection and the principal scanning.

Figure 14A:
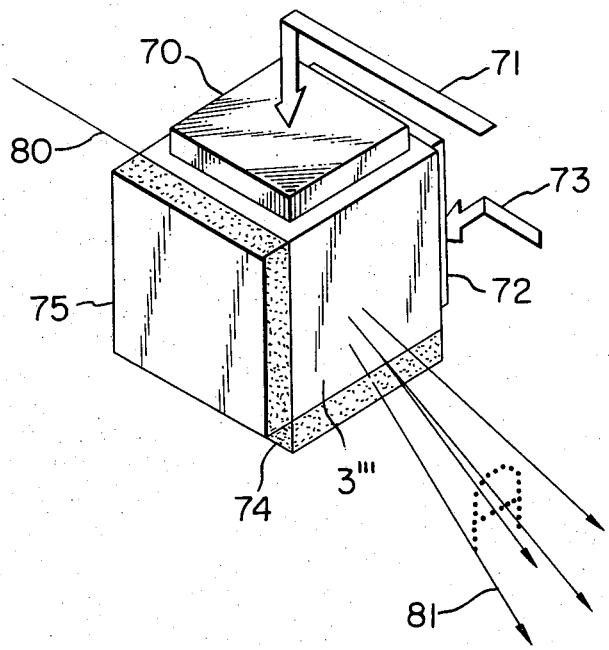
Figure 14B:
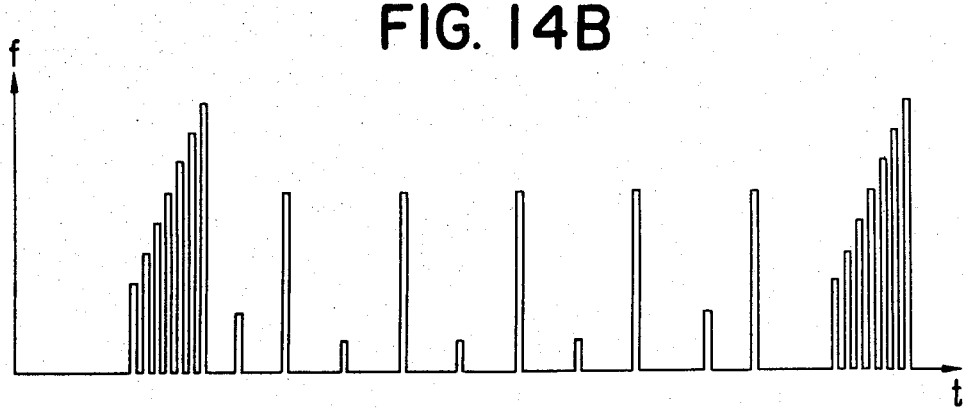
Figure 14C:
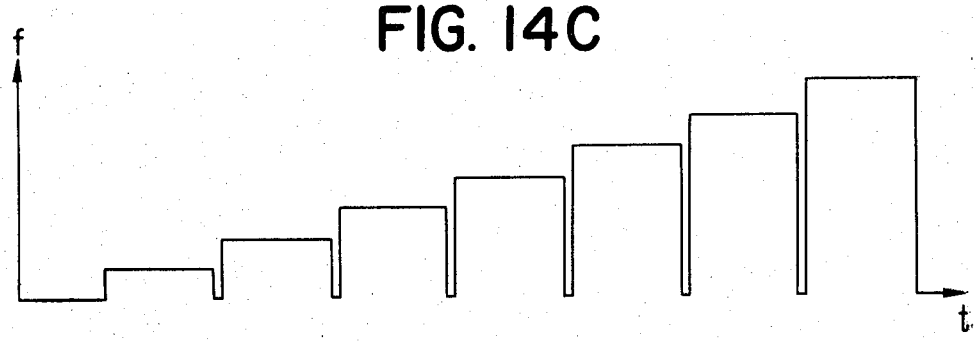

FIGS. 14A, 14B and 14C indicate a case, wherein the system A is applied to the micro-deflection in both vertical and horizontal directions. The modulating function which performs "ON" and "OFF" operations of the beam is caused to be effected by the vertical deflection signal, hence the modulator 3 can be omitted.

Figure 15A:
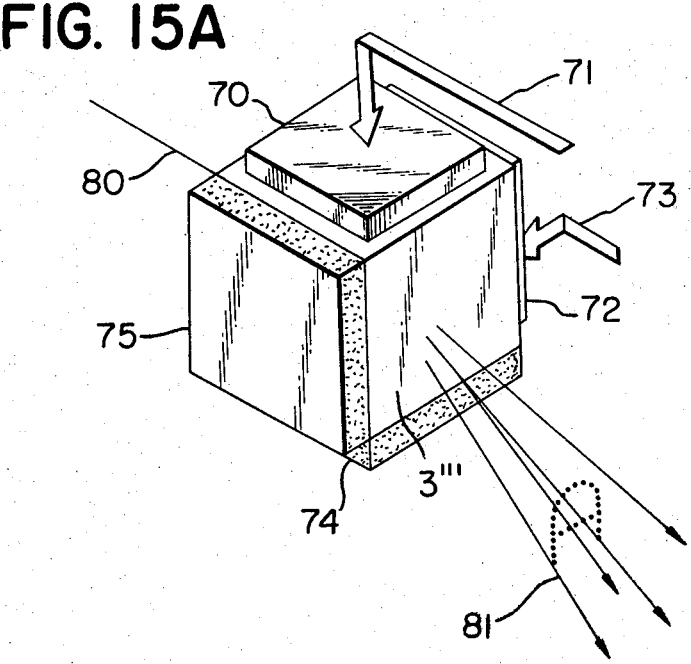
Figure 15B:
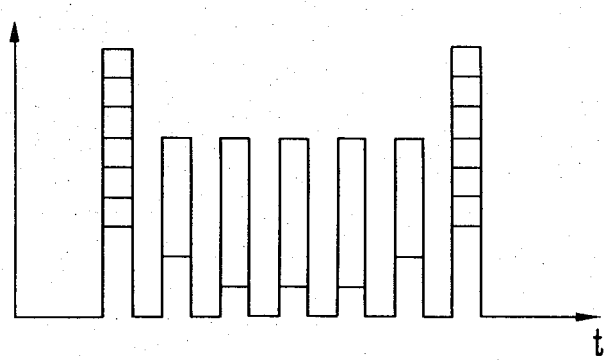
Figure 15C:
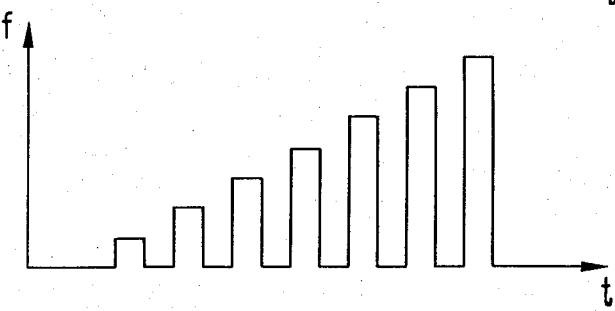

FIG. 15A, 15B and 15C indicate a case, wherein the system (B) is applied to the micro-deflection in the vertical direction, and the system (A) to the micro-deflection in the horizontal direction. The modulating function is undertaken by the vertical micro-deflection signal.

Figure 16A:
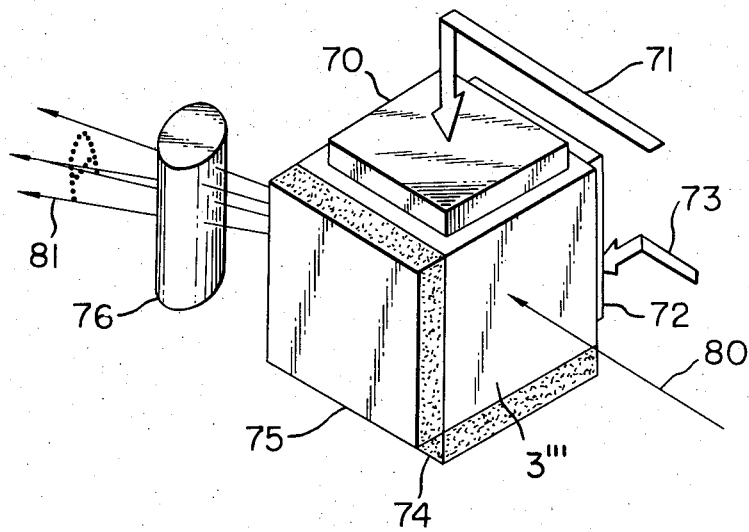
Figure 16B:
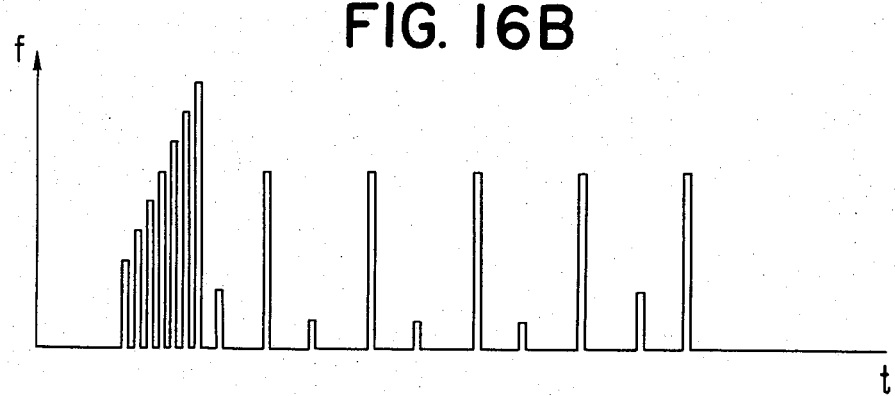
Figure 16C:
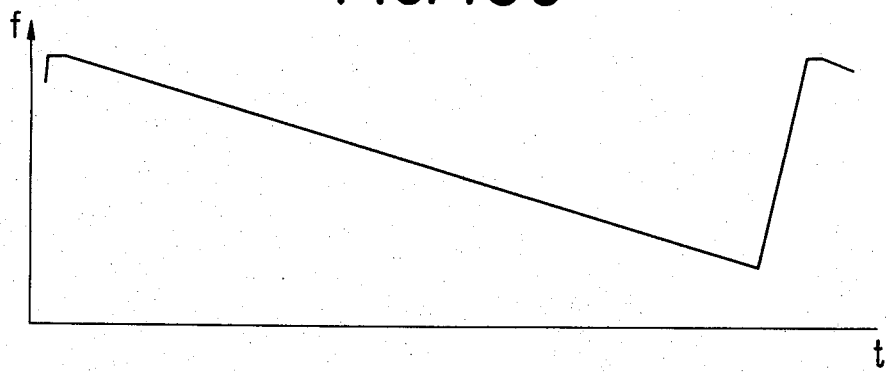

FIGS. 16A, 16B and 16C indicate a case, wherein the system (A) is applied to the vertical micro-deflection and the system (C) to the horizontal micro-deflection.

The modulating function is undertaken by the vertical micro-deflection signal.

Figure 17A:
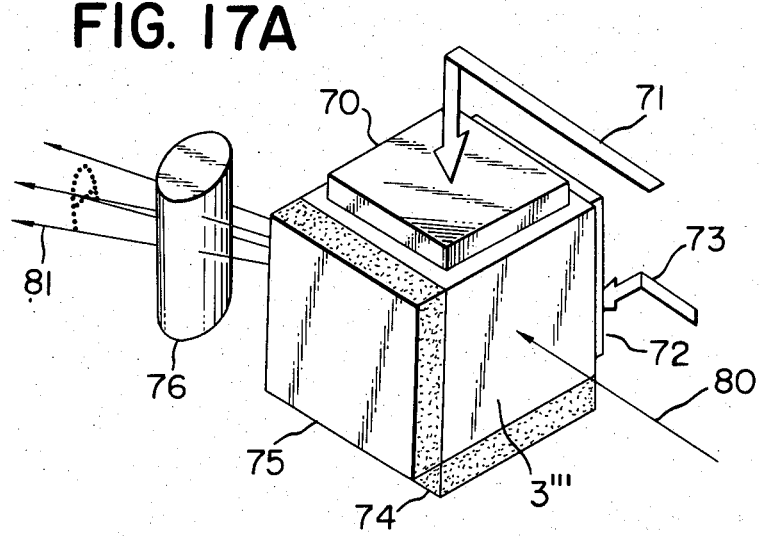

FIGS. 17A, 17B and 17C indicate a case, wherein the system (B) is applied to the vertical micro-deflection, and the system (C) to the horizontal micro-deflection. The modulating function is undertaken by the vertical micro-deflection signal.

Incidentally, common reference numerals throughout FIGS. 14A to 17C designate respectively the following components.

| | | |
|---|---|---|
| 3''' | acoustic-optical element (14A, 15A, 16A, 17A) | |
| 70 | electro-sonic conversion element for vertical deflection | |
| 71 | input signal for vertical deflection (14B, 15B, 16B, 17B) | |
| 72 | electro-sonic conversion element for horizontal deflection | |
| 73 | input signal for horizontal deflection (14C, 15C, 16C, 17C) | |
| 74 | supersonic wave absorbing material for vertical deflection | |
| 75 | supersonic wave absorbing material for horizontal deflection | |
| 76 | cylindrical lens | |
| 80 | incident light | |
| 81 | projection light | |

In the embodiments shown in FIGS. 14A through 17C, the modulator and the micro-deflector are realized in one and the same element 3''', although it is of course possible to provide a separate modulator as shown in FIG. 1. Further, it is possible to reverse the vertical and horizontal directions. Moreover, while the system (C) may be applied to both vertical and horizontal micro-deflection, the modulator should be provided separately in this case. Also, where the deflection speed is different between the horizontal and vertical directions (so it is in general), lenses having different power in the horizontal and vertical directions are necessary. In case the frequency variation factor varies in the system (C), lenses having a focal length which responds to variations in the frequency variation factor (i.e., lens having a variable focal length) is required.

Thus, in the course of one principal scanning operation, a pattern consisting of certain numbers of characters for one line are given on the photosensitive drum 8. During this period, the photosensitive drum 8 continues its constant rotation to shift for an appropriate line spacing.

Furthermore, upon receipt of instruction from both printer control circuit 33 (FIG. 3) and instruction circuit 24, the printer operation is started and, at the same time, the "printer ready" signal is returned to the instruction circuit 24. When the signal is added to the modulator 3 and the initial data at the first page is written in on the photosensitive drum, recording paper 11 is fed out of the paper feeding mechanism so that this written-in data may be transferred at the head part of the paper at the predetermined transfer position. In this way, the character and pattern informations from the computer 21 are output on an ordinary paper as a clear hard copy.

As detailed in the foregoing, the present invention has made it possible to record pattern and character informations output from the computers, etc. at high speed and high quality, which the conventional devices could not at all achieve.

In utilization of the good focussing property of the laser beam, a very sharp and stable spot can be obtained in comparison with the conventional electrostatic printer, CRT printer, and so on. This is because the F number of the above-mentioned f-$\theta$ lens 7 (FIG. 1) can be designed as large as 50 and above, a focal depth can be taken deep, and, in view of monochromatic in nature, no chromatic abberration needs be taken into consideration, and so on, so that designing of the optical system is easy, and permissible range of errors in assembly can be taken large.

Also, by combining the electrophotographic method to be used in the present invention and the laser beam exposure, a hard copy of the image information can be obtained on an ordinary quality paper with sharp contrast, in point of which the present invention also contributes to a remarkable improvement in performance in comparison with the conventional devices.

Incidentally, when the laser beam having an image signal is scanned on the rotating photosensitive drum in the direction parallel to the axial direction of the photosensitive drum, the scanning line on the drum surface becomes slightly slanted. In order to correct this obliqueness, it is better to slant the scanning line from the first (vide: FIGS. 18A and 18B). In this case, when the polyhedral revolving mirror alone is slanted, the scanning line becomes curved as shown in FIG. 18C.

In the present invention, as shown in FIG. 19, the optical system is entirely mounted on a table 200 and this table is fixed in an inclined position on a support 201 in the direction where the inclination of the scanning line is corrected with respect to the photosensitive drum, whereby the picture image on the transfer paper can be correctly recorded as shown in FIG. 18B.

Furthermore, when the laser recording device of the present invention is considered as a data processing device for computer output device, etc., for example, reliability of the device should be the most important point to be taken into consideration. Form this standpoint, He-Ne gas laser (wavelength of 633 m$\mu$) available at present in the most advantageous, from its various aspects of high stability, long serviceable life, simplicity in handling, low price, and so on. It is well admitted that from these various aspects the He-Ne gas laser should be the first that is to be mentioned.

In the use of the He-Ne gas laser (wavelength of 633 m$\mu$) when a well-matched photosensitive material is chosen from the aspect of the spectral sensitivity characteristic of the photosensitive body, a high sensitivity and high speed recording become feasible. Considering the electrophotographic sensitive material as the laser recording material, zinc oxide (ZnO), amorphous selenium (Se), and cadmium sulfide (CdS) and so on are listed as representative examples. These materials possess respectively proper spectral sensitivity characteristics. Such spectral sensitivity characteristics of various electrophotographic sensitive material are shown in FIG. 20, wherein the curve G denotes the spectral sensitivity characteristic of CdS photosensitive body; the curve H denotes that of Se photosensitive body; the curve I denotes that of ZnO photosensitive body which has been treated for increase in chromatic sensitivity for ordinary reproduction; and the curve J indicates that of ZnO photosensitive body which has been treated for increase in its sensitivity with chrome-phenol blue for the red color region.

Figure 20:
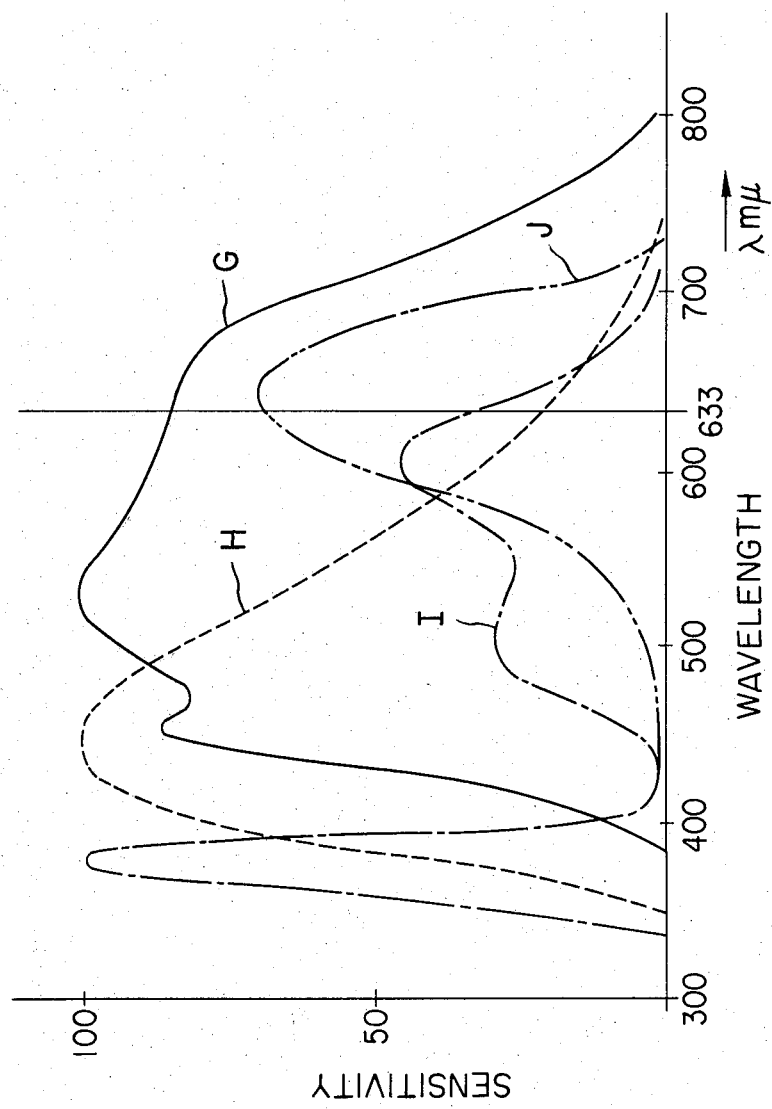
FIG. 20 is a graphical representation showing spectral sensitivity characteristics of various photosensitive materials for electrophotography.

As shown in FIG. 20, the high sensitivity region is deflected to the short wavelength side in the case of the Se photosensitive body, hence it does not match with the wavelength of 633 m$\mu$. It has been known that this sensitivity shifts to the side of the long wavelength by mixing arsenic (As) and tellurium (Te) with Se. Such method can of course be employed for the purpose of the present invention. Note, however, that addition of As or Te would be liable to cause the electrophotographic material to exhibit undersirable characteristics such as lowering in a dark resistance value, and so on. Therefore, it is necessary that measures be taken by constituting the photosensitive layer into a double-layer structure so as to avoid such undesirable phenomenon. In the case of ZnO, the proper sensitivity ranges from 350 to 400 m$\mu$, and it is possible to increase its chromatic sensitivity so as to meet the He-Ne laser beam (having wavelength of 633 m$\mu$). Its absolute sensitivity is less than one tenth (1/10) of the CdS photosensitive body to be described hereinafter.

FIG. 21 indicates sensitivity curves of the above-mentioned photosensitive bodies with respect to the He-Ne laser beam (wavelength of 633 m$\mu$). In this graphical representation, the abscissa denotes the irradiation energy density ($\mu$j/cm$^2$) of the He-Ne laser beam to these photosensitive bodies and the ordinate indicates the static image contrast (V) resulted from the electrophotographic process (a potential difference between bright and dark portions of the image when a sufficiently saturating irradiation energy is given). In this graphical representation, the curve K shows a case wherein a photosensitive body containing therein CdS and having an insulating layer on its surface is uniformly charged, then subjected to irradiation by the He-Ne gas laser beam with simultaneous A.C. corona discharge, and finally subjected to uniform, overall exposure; the curve L shows a case, wherein a photosensitive body containing therein Se and having an insulating layer on its surface is uniformly charged, then subjected to irradiation by the He-Ne gas laser beam with simultaneous A.C. corona discharge, and finally subjected to uniform, overall exposure; the curve M indicates a case, wherein a photosensitive body containing therein ZnO which has been treated for sensitivity increase for general reproduction purpose is uniformly charged followed by irradiation of He-Ne gas laser beam; and the curve N indicates a case, wherein a photosensitive body containing therein ZnO which has been treated for sensitivity increase with brome-phenol blue in the red color region is uniformly charged followed by irradiation of He-Ne gas laser beam.

From the results as expressed in the graphical representation in FIG. 21, it is found that the most appropriate material for the electrophotographic process available in general is cadmium sulfide (CdS) combined with He-Ne gas laser. One serious problem, however, exists with the photosensitive body containing CdS in that, for the system of image transfer operation on ordinary paper (the so-called "PPC system") to be realized by utilization of the Carlson process, the surface of the CdS photosensitive layer is too porous, and is very weak in physical and chemical properties thereof. In order to overcome such disadvantage inherent in the CdS photosensitive body, an improved type of the photosensitive body, which consists essentially of an insulating layer, a photoconductive layer containing CdS as the principal component, and an electrically conductive layer, is used. With this improved type of the photosensitive body, the surface of the body is charged in the positive polarity by means of the corona discharge, etc. to capture the negative electric charge in the vicinity of the interface between the insulating layer and the photoconductive layer, then photoconductive layer of the body is irradiated with the laser beam with simultaneous application of A.C. corona discharge by the corona discharger, or D.C. corona discharge of an opposite polarity to the abovementioned charge polarity, and finally the entire surface of the insulating layer is uniformly exposed to form an electrostatic image of high contrast in accordance with the bright and dark pattern of the abovementioned laser beam on the surface of the insulating layer.

According to the present invention, as has so far been described in detail, the pattern and character information outputs from the computer, etc. can be recorded at such high speed and high quality that could not at all be obtained by conventional devices. In other words, by the device of the present invention, approximately 10,000 lines per minute of the recording speed could be realized by printing numerals, anglicized letters, and katakana-characters of 9×7 dot construction in a format of 132 characters in one line with line pitch of 1/6 inch. Further, in comparison with the conventional electrostatic printer, CRT printer, etc., a very sharp spot can be stably obtained by use of the good focussing property of the laser beam. Such stable, sharp spot enables the F-number of the abovementioned f-$\theta$ lens 7 to be designed as large as 50 and above, its focal depth to be taken deeper, and the optical system to be easily designed, from the standpoint of chromatic abberration being not required to be considered owing to its mono chromatic light, and permissible range of errors in assembly to be taken larger. Further, by combination of the electrophotographic process used in the present invention and the laser beam exposure, hard copies of high and sharp contrast can be obtained on an ordinary quality paper, which contributes to remarkable improvement in the performance of the device in comparison with conventional ones.

Although the present invention has been described with particular reference to its preferred embodiments, it should be understood that the invention is not so limited as to these embodiments alone, but any change and modification may be made by those skilled in the art within the ambit of the present invention as recited in the appended claims.

We claim:

1. An image information recording device which comprises in combination:
   a. an He-Ne gas laser oscillator for generating a laser beam modulated by an image information signal;
   b. a photosensitive body consisting essentially of an insulating layer, a photoconductive layer and an electrically conductive substrate, said photoconductive layer comprising cadmium sulfide (CdS);
   c. deflection means to cause said laser beam to scan on said photosensitive body;
   d. optical means to focus said modulated and deflected laser beam on said photosensitive body;
   e. means to input said image information signal to said laser oscillator in synchronism with said deflection means;
   f. means for uniformly applying a first charge to said photosensitive body;
   g. means for imparting a second charge to said photosensitive body simultaneously with scanning said photosensitive body with said modulated and deflected laser beam to form an image pattern; and
   h. means to effect overall exposure of said photosensitive body after the simultaneous application of the second charge and said modulated and deflected laser beam on said photosensitive body to form a high contrast electrostatic latent image.

2. An information recording device according to claim 1, wherein said deflection means comprises in combination;
   a first deflection means to deflect said laser beam in a first scanning direction to cause the same to scan said photosensitive body;
   a second deflection means to deflect said laser beam in a second direction substantially perpendicular to said first scanning direction; and
   means to project said laser beam after deflection to said photosensitive body.

3. An information recording device according to claim 2, wherein said second deflection means deflects said laser beam in response to supersonic waves of differing frequencies added together in timed sequence.

4. An information recording device according to claim 2, wherein said second deflection means deflects said laser beam in response to supersonic waves of differing frequencies added simultaneously.

5. An information recording device according to claim 2, wherein said second deflection means deflects said laser beam in response to an applied supersonic wave having a frequency which varies with time.

6. An information recording device according to claim 1, wherein said deflection means comprises in combination:
   a first deflection means to deflect said laser beam in a first scanning direction to cause the same to scan said photosensitive body;
   a second deflection means to deflect said laser beam in a second direction substantially perpendicular to said first scanning direction;
   means to project said laser beam after deflection to said photosensitive body; and
   a third deflection means which causes said laser beam to deflect in a direction substantially parallel to said first scanning direction at a scanning angle and speed different from those of said first deflection means;
   wherein said first and second deflections are carried out simultaneously.

7. An image information recording device according to claim 1 further comprising means for holding said laser oscillator and said deflection means independently of said photosensitive body.

8. An image information recording device according to claim 7 further comprising means for changing beam diameter and wherein said beam diameter changing means is positioned between said laser oscillator and said deflection means which in turn is spaced from said photosensitive body.

9. An image information recording device according to claim 7, wherein the laser beam scans in a direction inclined with respect to a direction perpendicular to the direction of movement of the photosensitive body to avoid the formation of a tilted image, said scanning direction being established by tilting said holding means.

10. An image information recording device according to claim 9, wherein said photosensitive body comprises a rotating drum and wherein said deflection means scans said rotating drum at an oblique angle to the longitudinal axis of the drum in order to prevent curvation of the resultant image.

11. An image information recording device which comprises in combination:
   a. an He-Ne gas laser oscillator for generating a laser beam modulated by an image information signal;
   b. a photosensitive body consisting essentially of an insulative layer, a photoconductive layer, and an electrically conductive substrate, said photoconductive layer comprising cadmium sulfide (CdS);
   c. deflection means to cause said laser beam to scan on said photosensitive body;
   d. optical means to focus said modulated and deflected laser beam on said photosensitive body;
   e. means to input said image information signal to said laser oscillator in synchronism with said deflection means;
   f. means for uniformly applying a first charge to said photosensitive body; and
   g. means for imparting a second charge to said photosensitive body immediately before scanning said photosensitive body with said modulated and deflected laser beam, wherein a high contrast electrostatic latent image is formed upon application of the modulated beam to the photosensitive body.

12. An image information recording device which comprises in combination:
   a. an He-Ne gas laser oscillator for generating a laser beam modulated by an image information signal;
   b. a photosensitive body consisting essentially of an insulative layer, a photoconductive layer, and an electrically conductive substrate, said photoconductive layer comprising cadmium sulfide (CdS);
   c. deflection means to cause said laser beam to scan on said photosensitive body;
   d. optical means to focus said modulated and deflected laser beam on said photosensitive body;
   e. means to input said image information signal to said laser oscillator in synchronism with said deflection means;
   f. means for uniformly applying a first charge to said photosensitive body;
   g. means for imparting a second charge to said photosensitive body immediately after scanning said photosensitive body with said modulated and deflected laser beam to form an image pattern; and
   h. means to effect overall exposure of said photosensitive body after the application of the second charge to form a high contrast electrostatic latent image.

13. An image information recording device which comprises in combination:
   a. an He-Ne gas laser oscillator for generating a laser beam modulated by an image information signal;
   b. a photosensitive body consisting essentially of an insulating layer, a photoconductive layer and an electrically conductive substrate, said photoconductive layer comprising cadmium sulfide (CdS);
   c. deflection means to cause said laser beam to scan on said photosensitive body;
   d. optical means to focus said modulated and deflected laser beam on said photosensitive body, said optical means including a scanning lens between the photosensitive body and the deflection means having a focal length f that conforms to the relationship $r = f \cdot \theta$, where $\theta$ is the angle between the light beam and an optical axis of the lens, and r is the length between the optical axis and focusing position on the photosensitive body, whereby the laser beam scans the photosensitive body at a constant linear velocity with constant focusing;

e. means to input said image information signal to said laser oscillator in synchronism with said deflection means;

f. means for uniformly applying a first charge to said photosensitive body;

g. means for imparting a second charge to said photosensitive body simultaneously with scanning said photosensitive body with said modulated and deflected laser beam to form an image pattern;

h. means to effect overall exposure of said photosensitive body after the simultaneous application of the second charge and said modulated beam to form a high contrast electrostatic latent image; and i. a position detection means for detecting the laser beam position in order to set the position for the scanning laser beam to commence scanning on said photosensitive body, said input means being controlled by said position detecting means.

14. The image information recording device according to claim 13, wherein said means for imparting a second charge is a corona discharge means which effects alternating current corona discharge in the frequency of $f \geq V/P$ Hz, where V is a relative speed (cm./sec.) between said photosensitive body and said laser beam, and P is a constant for the device which represents the allowable pitch (cm.) due to the A.C. corona discharge frequency on said photosensitive body.

15. An image information recording device according to claim 14, wherein P has a value of 0.03.

16. The image information recording device according to claim 13, wherein said deflection means consists of a polyhedral revolving mirror.

17. The image information recording device according to claim 13, wherein said deflection means consists of a galvanomirror.

18. An image information recording device which comprises in combination:

a. an He-Ne gas laser oscillator for generating a laser beam modulated by an image information signal;

b. a photosensitive body consisting essentially of an insulating layer, a photoconductive layer, and an electrically conductive substrate, said photoconductive layer comprising cadmium sulfide (CdS);

c. deflection means to cause said laser beam to scan on said photosensitive body;

d. optical means to focus said modulated and deflected laser beam on said photosensitive body;

e. means to input said image information signal to said laser oscillator in synchronism with said deflection means;

f. means to electrically charge said photosensitive body;

g. corona discharge means for imparting alternating or direct current corona discharge to said photosensitive body simultaneously with scanning said photosensitive body with said modulated and deflected laser beam to form an image pattern;

h. means to effect overall exposure of said photosensitive body after the simultaneous application of the corona discharge and said modulated beam to said photosensitive body to form an electrostatic latent image;

i. means to develop a formed electrostatic latent image;

j. means to transfer said developed image onto an image transfer material;

k. means to clean said photosensitive body; and l. means to fix the transferred image.

19. An image information recording device which comprises in combination:

a. means to generate a laser beam modulated by an image information signal;

b. a photosensitive body consisting essentially of an insulating layer, a photoconductive layer and an electrically conductive substrate;

c. deflection means to cause said laser beam to scan on said photosensitive body;

d. optical means to focus said modulated and deflected laser beam on said photosensitive body;

e. means to input said image information signal to said generating means in synchronism with said deflection means;

f. means to electrically charge said photosensitive body;

g. corona discharge means for imparting alternating current corona discharge to said photosensitive body simultaneously with scanning said photosensitive body with said modulated and deflected laser beam, said corona discharge means effecting alternating current corona discharge in the frequency of $f \geq V/P$ Hz, where V is the relative speed (cm/sec.) between said photosensitive body and said laser beam, and P is a constant for the device which represents the allowable pitch (cm.) due to the A.C. corona discharge frequency on said photosensitive body; and h. means to effect overall exposure to said photosensitive body after the simultaneous application of corona discharge and said modulated beam to said photosensitive body to form a high contrast electrostatic latent image.

20. An information recording device according to claim 19, wherein said means for generating a modulated laser beam includes means for generating an unmodulated beam and means for modulating said unmodulated beam by the image information signal.

21. An image information recording device according to claim 19, wherein P has a value of 0.03.

22. An information recording device according to claim 19, wherein said beam forming means includes a current modulation type laser oscillator.

23. An information recording device according to claim 19, wherein said beam forming means includes an internal modulation type laser oscillator having a modulation element built therein across a beam emergent path of the laser oscillator.

24. An image information recording device which comprises in combination:

a. means to generate a laser beam modulated by an image information signal;

b. a photosensitive body having an insulating layer, a photoconductive layer whose spectral sensitivity matches with said laser beam, and an electrically conductive substrate;

c. deflection means including a polygonal mirror or a galvano-mirror to cause said laser beam to scan said photosensitive body;

d. optical means to focus said laser beam on the photosensitive body, said optical means including f-$\theta$ lens which is a lens having a focal length f that conforms to relationship of $r = f \cdot \theta$, where $\theta$ is the angle between the laser beam and an optical axis of the lens, and r is the length between the optical axis and focusing position on the photosensitive body;

e. a position detection means to set a position for the laser beam to commence scanning on said photosensitive body;

f. means to input said image information signal to said generating means in synchronism with said deflection means by means of an output signal from said position detection means;

g. means to electrically charge said photosensitive body;

h. corona discharge means for imparting alternating current corona discharge in the frequency of $f \geq V/P$, where V is relative speed (cm/sec.) between said photosensitive body and said light beam, and P is a constant for the device which represents the allowable pitch (cm.) due to the A.C. corona discharge frequency on said photosensitive body, simultaneously with the scanning of said light beam as modulated and deflected on said photosensitive body;

i. means to effect overall exposure to said photosensitive body;

j. means to develop a formed electrostatic latent image;

k. means to transfer the developed image to a transfer material;

l. means to fix the transferred image; and m. means to clean said photosensitive body.

25. An image information recording device according to claim 24, wherein P has a value of 0.03.

26. A laser recording device which comprises in combination:

a. a semiconductor laser oscillator for forming a modulated laser beam;

b. a photosensitive body consisting essentially of an insulating layer, a photoconductive layer, and an electrically conductive substrate;

c. deflection means to cause said modulated laser beam to scan said photosensitive body;

d. optical means to focus said modulated and deflected laser beam on said photosensitive body;

e. means to input an image information signal to said oscillator in synchronism with said deflection means;

f. means to electrically charge said photosensitive body;

g. corona discharge means for imparting alternating current corona discharge to said photosensitive body simultaneously with the scanning of said photosensitive body with said modulated and deflected laser beam, said corona discharge means effecting alternating current corona discharge in the frequency of $f \geq V/P$ Hz, where V is the relative speed (cm/sec.) between said photosensitive body and said laser beam, and P is a constant for the device which represents the allowable pitch (cm.) due to the A.C. corona discharge frequency on said photosensitive body; and h. means to effect overall exposure of said photosensitive body after the simultaneous application of the corona discharge and the modulated beam on said photosensitive body to form a high contrast electrostatic latent image.

27. A laser recording device according to claim 26, wherein P has a value of 0.03.

28. An information recording device comprising in combination:

means for generating an information signal;

means for generating an He-Ne gas laser beam modulated in accordance with the information signal;

a recording medium sensitive to the laser beam, said recording medium consisting essentially of an insulating layer, a photoconductive layer containing CdS powder and an electrically conductive substrate;

an interface circuit for inputting the information signal, and for generating an instruction signal;

a data memory for storing a predetermined amount of information data input by said interface circuit;

an instruction circuit for receiving the instruction signal from said interface circuit;

a character generator for generating character data;

a data generator for producing data to scan said recording medium in accordance with information to be recorded thereon, said data generator being connected with said data memory, said instruction circuit and said character generator to receive signals therefrom;

buffer means for temporarily storing the signal from said data generator;

generator control means for producing a signal to actuate said generating means in accordance with a signal read out of said buffer means;

means for causing the laser beam thus modulated to scan said recording medium; and means for forming on said recording medium an electrostatic image in accordance with the thus modulated laser beam.

29. A data recording device comprising in combination:

a recording medium sensitive to a laser beam;

means for forming a laser beam modulated in accordance with data to be recorded on said recording medium;

means for causing the modulated laser beam to scan said recording medium;

means for producing data for modulating the laser beam;

means for storing a predetermined amount of the data produced by said modulating data producing means in accordance with a scanning operation;

means for driving said modulator means in accordance with the modulating data;

means for detecting when the laser beam is at a particular position;

means for controlling said driving means in response to said detecting means;

means to electrically charge said recording medium; and corona discharge means for imparting alternating current corona discharge to said recording medium simultaneously with scanning said recording medium with said modulated laser beam, said corona discharge means effecting alternating current corona discharge in the frequency of $f \geq V/P$ Hz, where V is the relative speed (cm/sec.) between said photosensitive body and said laser beam, and P is a constant for the device which represents the allowable pitch (cm.) due to the A.C. corona discharge frequency on said recording medium.

30. A data recording device according to claim 29, wherein said storing means includes at least two data buffer means, one of said buffer means being in a signal read-in mode when the other buffer means is in a signal read-out mode.

31. A data recording device according to claim 29, further including means for providing enlarged data information on said recording medium.

32. A data recording device according to claim 31, wherein said data information is enlarged by repeatedly reading out the character data from said storing means.

33. A data recording device according to claim 29, wherein said means for forming a modulated laser beam includes means for modulating said unmodulated beam in accordance with the modulating data.

34. A data recording device according to claim 29, wherein P has a value of 0.03.

35. An information recording device according to claim 29, wherein said beam forming means includes a semiconductor laser beam generator.

36. An information recording device according to claim 29, wherein said beam forming means includes a laser oscillator for generating an unmodulated laser beam and a modulator for modulating the laser beam in accordance with an information signal.

37. An image information recording device which comprises in combination:
 a. a photosensitive body including an insulating layer, a photoconductor layer, and an electrically conductive substrate, said photoconductive layer comprising cadmium sulfide (cds);
 b. means to apply a first charge to said photosensitive body;
 c. means to form a modulated beam of electro-magnetic radiation in accordance with an information signal, wherein the modulated beam is a coherent beam having a wavelength of 450 m$\mu$–700 m$\mu$ to which said photoconductive layer has substantial spectral sensitivity;
 d. deflection means to cause the modulated beam to scan said photosensitive body;
 e. means to impart a second charge to said photosensitive body for forming an image pattern; and
 f. means to effect overall exposure of said photosensitive body after said photosensitive body has been scanned and subjected to the second charge to thereby form a high contrast image on the surface of said insulating layer.

38. An information recording device according to claim 37, wherein said means to impart the second charge imparts the second charge simultaneously with the scanning of the photosensitive member with the modulated beam.

39. An information recording device according to claim 37, wherein said means to impart the second charge imparts the second charge immediately after said photosensitive member is scanned with the modulated beam.

40. An information recording device according to claim 37, wherein said means to impart the second charge includes an AC corona discharger.

41. An information recording device according to claim 37, wherein said means to impart the second charge includes a DC corona discharger for applying a charge of a polarity opposite to that of the first charge.

42. An image information recording device which comprises in combination:
 a. a photosensitive body;
 b. means to form a beam of electro-magnetic radiation modulated in accordance with image information;
 c. scanning means to cause the modulated beam to scan said photosensitive body;
 d. means to form an electrostatic image on said photosensitive body in accordance with the modulated beam scanning said photosensitive body, said electrostatic image forming means including a corona discharger for imparting alternating current corona discharge to said photosensitive body simultaneously with the scanning of said photosensitive body with the modulated beam, said corona discharger being supplied with an alternating current power source having a frequency which prevents the alternating current corona from causing a non-uniform potential of the electrostatic image which would result in a non-uniform developed image; and
 e. means to develop the electrostatic image with a developer.

43. An image information recording device which comprises in combination:
 a. a laser oscillator for forming a modulated laser beam;
 b. a photosensitive body including an insulating layer, a photoconductive layer, and an electrically conductive substrate, said photoconductive layer comprising cadmium sulfide CdS);
 c. scanning means to cause the modulated laser beam to scan said photosensitive body;
 d. optical means to focus the modulated laser beam on said photosensitive body;
 e. means to input an image information signal to said oscillator;
 f. means to electrically charge said photosensitive body;
 g. corona discharge means to impart alternating current corona discharge to said photosensitive body simultaneously with the scanning of said photosensitive body with the modulated laser beam;
 h. means to effect overall exposure of said photosensitive body after said photosensitive body has been scanned and subjected to the corona discharge to form a high contrast electrostatic latent image; and
 i. means to develop the formed electrostatic latent image with developer which is retained on the surface portions of said photosensitive body subjected to the modulated laser beam.

44. An image information recording device which comprises in combination:
 a. a laser oscillator for forming a modulated laser beam;
 b. a photosensitive body including an insulating layer, a photoconductive layer, and an electrically conductive substrate, said photoconductive layer comprising cadmium sulfide (CdS);
 c. scanning means to cause the modulated laser beam to scan said photosensitive body;
 d. optical means to focus the modulated laser beam on said photosensitive body;
 e. means to input an image information signal to said oscillator;
 f. means to uniformly apply a first charge to said photosensitive body;
 g. means to impart a second charge to said photosensitive body immediately before scanning said photosensitive body with the modulated laser beam to form a high contrast electrostatic latent image; and
 h. means to develop the formed electrostatic latent image with developer which is retained on the surface portions of said photosensitive body subjected to the modulated laser beam.

45. An image information recording device which comprises in combination:
a. a laser oscillator for forming a modulated laser beam;
b. a photosensitive body including an insulating layer, a photoconductive layer, and an electrically conductive substrate, said photoconductive layer comprising cadmium sulfide (CdS);
c. scanning means to cause the modulated laser beam to scan said photosensitive body;
d. optical means to focus the modulated laser beam on said photosensitive body;
e. means to input an image information signal to said oscillator;
f. means to uniformly apply a first charge to said photosensitive body;
g. means to impart a second charge to said photosensitive body immediately after scanning said photosensitive body with the modulated laser beam to form an image pattern;
h. means to effect overall exposure of said photosensitive body after said photosensitive body has been subjected to the second charge to form a high contrast electrostatic latent image, and
i. means to develop the formed electrostatic latent image with developer which is retained on the surface portions of the photosensitive body subjected to the modulated laser beam.

46. An image information recording device which comprises in combination:
a. a photosensitive body including an insulating layer, a photoconductive layer, and an electrically conductive substrate;
b. means to form a beam of electro-magnetic radiation of a diameter modulated by an image information signal;
c. scanning means to cause the modulated beam to scan said photosensitive body to project dots of a predetermined diameter onto said photosensitive body.
d. beam diameter control means disposed between said beam forming means and said photosensitive body, to alter the diameter of the beam formed by said beam forming means before it impinges on said photosensitive body;
e. charging means to uniformly apply a first charge to a surface of the insulating layer;
f. corona discharge means to apply a second charge to the surface of the insulating layer of the photosensitive body, and to allow the modulated beam to reach the photosensitive body therethrough and thereby form an image pattern;
g. means to effect overall exposure of said photosensitive body after the application of the second charge and the modulated beam to said photosensitive body, to form an electrostatic image in accordance with the dots formed by the incident beam; and
h. means to develop the electrostatic image with a developer.

47. An image information recording device according to claim 46, wherein said beam diameter control means includes a beam expander for converting the beam formed by said beam forming means into a parallel beam having a diameter larger than the diameter of the beam formed by said beam forming means, and an optical system for focusing the parallel beam onto said photosensitive body.

48. An image information recording device which comprises in combination:
a. means to form a beam electro-magnetic radiation modulated in accordance with an information signal;
b. a recording medium;
c. first deflecting means to cause the modulated beam to scan said recording medium in a main scanning direction of said recording medium;
d. second deflecting means to deflect the modulated beam in a subordinate direction perpendicular to the main scanning direction;
e. means to temporarily store information signals;
f. first means to read out data from said storing means so as to extend, in accordance with a predetermined image magnification, the time period during which one modulation signal is utilized for modulation along the main scanning direction;
g. second means to read out one modulation signal repeatedly from said storing means so as to modulate, with the one modulation signal, the number of beams corresponding to the image magnification in the subordinate scanning direction;
h. modulation control means to cause modulation in said beam forming means in accordance with the signals read out of said first and second read out means; and
i. means to form an electrostatic image in accordance with the modulated beam scanning said recording medium.

* * * * *

UNITED STATES PATENT AND TRADEMARK OFFICE
CERTIFICATE OF CORRECTION

PATENT NO. : 4,233,612  Page 1 of 3
DATED : November 11, 1980
INVENTOR(S) : KAZUHIRO HIRAYAMA, ET AL.

It is certified that error appears in the above-identified patent and that said Letters Patent are hereby corrected as shown below:

Column 4, 11 line, "of" should read --or--;

Column 5, line 64, "on" should read --of--;

Column 6, line 19, "on" should read --of--;

Column 7, line 17, "$\sin(\theta + \phi) \cdot \exp(-\frac{t}{C_p R_c})$" should read --$\sin(\theta + \phi) \cdot \exp(-\frac{t}{C_p R_c})$}--;

line 18, before "Vo" add -- + --;

line 39, "Further, a" should read --Further, an--;

Column 8, line 9, "abovemenioned" should read --abovementioned--;

Column 9, line 35, "embodiment" should read --arrangement--;

Column 10, line 64, "directly" should read --either directly--;

Column 11, line 35, "adding to the" should read --added to a--;

Column 12, line 6, "oscillator" should read --oscillator 1--;

Column 13, line 6, "detection" should read --detection of--;

line 61, "of the different" should read --of nine different--;

UNITED STATES PATENT AND TRADEMARK OFFICE
CERTIFICATE OF CORRECTION

PATENT NO. : 4,233,612  Page 2 of 3
DATED : November 11, 1980
INVENTOR(S) : KAZUHIRO HIRAYAMA, ET AL.

It is certified that error appears in the above-identified patent and that said Letters Patent are hereby corrected as shown below:

Column 14, line 58, "a acoustic" should read --an acoustic--; "3" should read --3"--;

line 62, "3" should read --3"--;

line 63, "3" should read --3"--;

Column 15, line 14, "1A=1B" should read --$_1$A =$_1$B--;

line 16, "1A(=1B)" should read --$_1$A(=$_1$B)--;

line 33, "3" should read --3"--;

Column 17, line 27, "point" should read --point)--;

line 65, "N$\tau_E$" should read --N$\tau''_E$--; "N·$\tau_E$" should read --N·$\tau''_E$--;

line 67, "$\tau_E$"2" should read --$\tau''_E$2--; "$\tau_E$" should read --$\tau''_E$--;

Column 18, line 1, "$\tau_E$"2" should read --$\tau''_E$2--; "$\tau_E$" should read --$\tau''_E$--; line 6, "/$\tau_E$" should read --/$\tau''_E$--;

Column 20, line 39, "in" should read --is--;

Column 29, line 26, (cds) should read --(CdS)--;

Column 29, line 48, "of the" should read --of said--;

UNITED STATES PATENT AND TRADEMARK OFFICE
CERTIFICATE OF CORRECTION

PATENT NO. : 4,233,612

DATED : November 11, 1980

INVENTOR(S) : KAZUHIRO HIRAYAMA, ET AL.

It is certified that error appears in the above-identified patent and that said Letters Patent are hereby corrected as shown below:

Column 30, line 24, "CdS)" sould read --(CdS)--

In the drawings the deflector at the upper right hand side of Fig. 11 should have a reference numeral --3"--.

Signed and Sealed this

Seventh Day of April 1981

[SEAL]

Attest:

RENE D. TEGTMEYER

*Attesting Officer*  *Acting Commissioner of Patents and Trademarks*